United States Patent
Broering et al.

(10) Patent No.: US 12,466,156 B2
(45) Date of Patent: *Nov. 11, 2025

(54) THERMOPLASTIC BAGS WITH COMPLEX STRETCH PATTERNS

(71) Applicant: The Glad Products Company, Oakland, CA (US)

(72) Inventors: Shaun T. Broering, Fort Thomas, KY (US); Michael G. Borchardt, Naperville, IL (US); Ranyi Zhu, Naperville, IL (US); Jason R. Maxwell, Willowbrook, IL (US); Daniel Charles Peck, Mason, OH (US); Hugh Joseph O'Donnell, Cincinnati, OH (US); Robert T. Dorsey, Willowbrook, IL (US); Lehai Minh Pham Vu, Monroe, OH (US); Karen Denise McAffry, Maineville, OH (US)

(73) Assignee: The Glad Products Company, Oakland, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/525,492

(22) Filed: Nov. 30, 2023

(65) Prior Publication Data

US 2024/0092054 A1    Mar. 21, 2024

Related U.S. Application Data

(63) Continuation of application No. 18/491,008, filed on Oct. 20, 2023, which is a continuation of application
(Continued)

(51) Int. Cl.
*B32B 3/28* (2006.01)
*B29C 55/08* (2006.01)
(Continued)

(52) U.S. Cl.
CPC ............... *B32B 3/28* (2013.01); *B29C 55/08* (2013.01); *B29C 55/18* (2013.01); *B29D 7/01* (2013.01);
(Continued)

(58) Field of Classification Search
CPC .. B32B 3/28; B32B 3/30; B32B 27/08; B32B 7/05; B32B 37/0038; B32B 2274/00;
(Continued)

(56) References Cited

U.S. PATENT DOCUMENTS 3,550,839 A    12/1970    Clayton et al.
4,469,735 A    9/1984    Trokhan
(Continued)

FOREIGN PATENT DOCUMENTS

CN    1516645 A    7/2004
CN    101553409 A    10/2009
(Continued)

OTHER PUBLICATIONS

Examination Report as received in Australian application 2023202889 dated Jul. 2, 2024.
(Continued)

*Primary Examiner* — Nathan L Van Sell
(74) *Attorney, Agent, or Firm* — Keller Preece PLLC

(57) ABSTRACT

A thermoplastic film which exhibits elastic-like behavior along at least one axis when stretched or elongated and then released. The thermoplastic film comprises a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and plurality of web areas are arranged in a complex pattern. The complex pattern provides visual and tactile cues as the films are
(Continued)

stretched or elongated. The complex pattern can cause the thermoplastic film to have a complex stretch profile.

20 Claims, 20 Drawing Sheets

Related U.S. Application Data

No. 17/933,332, filed on Sep. 19, 2022, now Pat. No. 11,826,996, which is a continuation of application No. 16/761,191, filed as application No. PCT/US2018/058998 on Nov. 2, 2018, now Pat. No. 11,485,108.

(60) Provisional application No. 62/583,108, filed on Nov. 8, 2017.

(51) Int. Cl.

| | | |
|---|---|---|
| *B29C 55/18* | (2006.01) | |
| *B29D 7/01* | (2006.01) | |
| *B31B 70/00* | (2017.01) | |
| *B31B 70/86* | (2017.01) | |
| *B31B 70/88* | (2017.01) | |
| *B31B 155/00* | (2017.01) | |
| *B31B 170/20* | (2017.01) | |
| *B32B 3/30* | (2006.01) | |
| *B32B 7/05* | (2019.01) | |
| *B32B 27/08* | (2006.01) | |
| *B32B 37/00* | (2006.01) | |
| *B65D 65/40* | (2006.01) | |
| *B65F 1/00* | (2006.01) | |

(52) U.S. Cl.
CPC ............ *B31B 70/008* (2017.08); *B31B 70/88* (2017.08); *B32B 3/30* (2013.01); *B32B 27/08* (2013.01); *B65D 65/403* (2013.01); *B65F 1/0006* (2013.01); *B31B 70/866* (2017.08); *B31B 2155/0014* (2017.08); *B31B 2155/002* (2017.08); *B31B 2170/20* (2017.08); *B32B 7/05* (2019.01); *B32B 37/0038* (2013.01); *B32B 2274/00* (2013.01); *B32B 2307/7145* (2013.01); *B65F 2250/114* (2013.01)

(58) Field of Classification Search
CPC . B32B 2307/7145; B32B 7/12; B32B 27/285; B32B 27/306; B32B 2250/02; B32B 2250/24; B32B 27/308; B32B 27/32; B32B 27/34; B32B 2264/101; B32B 2264/102; B32B 2264/108; B32B 27/205; B32B 27/36; B32B 27/302; B32B 27/40; B32B 2264/104; B32B 2270/00; B32B 2307/518; B32B 2307/54; B32B 2307/7163; B32B 2439/06; B32B 2553/00; B32B 2555/02; B29C 55/08; B29C 55/18; B29D 7/01; B31B 70/008; B31B 70/88; B31B 70/866; B31B 2155/0014; B31B 2155/002; B31B 2170/20; B65D 65/403; B65F 1/0006; B65F 2250/114; B31F 2201/00; B31F 2201/0741; B31F 2201/0751; B31F 2201/0764

See application file for complete search history.

(56) References Cited

U.S. PATENT DOCUMENTS

| | | |
|---|---|---|
| 4,814,135 A | 3/1989 | Heitz |
| 4,857,600 A | 8/1989 | Gross et al. |
| 5,076,988 A | 12/1991 | Rifi |
| 5,153,382 A | 10/1992 | Gross et al. |
| 5,229,186 A | 7/1993 | Tribble et al. |
| 5,468,428 A | 11/1995 | Hanschen et al. |
| 5,518,801 A | 5/1996 | Chappell et al. |
| 5,609,702 A | 3/1997 | Anderson |
| 5,650,214 A | 7/1997 | Anderson et al. |
| 5,716,137 A | 2/1998 | Meyer |
| 8,603,609 B2 | 12/2013 | Fraser et al. |
| 9,186,862 B2 | 11/2015 | Broering et al. |
| 9,637,278 B2 | 5/2017 | Borchardt et al. |
| 10,293,981 B2 | 5/2019 | Borchardt et al. |
| 11,485,108 B2 | 11/2022 | Broering et al. |
| 2006/0093766 A1* | 5/2006 | Savicki ............... B65D 31/00 428/181 |
| 2007/0264897 A1* | 11/2007 | Collias ................ C08J 5/18 428/401 |
| 2010/0121295 A1* | 5/2010 | Collias ............ A61F 13/4752 977/773 |
| 2012/0039550 A1 | 2/2012 | MacPherson et al. |
| 2012/0063704 A1 | 3/2012 | Hoying et al. |
| 2012/0123370 A1 | 5/2012 | Melik et al. |
| 2013/0011084 A1 | 1/2013 | Broering et al. |
| 2014/0023829 A1 | 1/2014 | Broering et al. |

FOREIGN PATENT DOCUMENTS

| | | |
|---|---|---|
| CN | 103508049 A | 1/2014 |
| CN | 204222116 U | 3/2015 |
| CN | 106166855 A | 11/2016 |
| JP | 2005206183 A | 8/2005 |
| JP | 2006027697 A | 2/2006 |
| JP | 2012035885 A | 2/2012 |
| JP | 2015003754 A | 1/2015 |
| JP | 2015214351 A | 12/2015 |
| JP | 2016011132 A | 1/2016 |

OTHER PUBLICATIONS

Examination Report as received in Australian application 2023202889 dated Oct. 15, 2024.
International Search Report & Written Opinion as received in PCT/US2018/058998 dated Jan. 24, 2019.
Office Action as received in Chinese application 201880084308.5 dated Aug. 16, 2021.
Examination Report as received in Australian application 2018365772 dated Nov. 25, 2022.
U.S. Appl. No. 16/761,191, Oct. 22, 2021, Office Action.
U.S. Appl. No. 16/761,191, Apr. 7, 2022, Office Action.
U.S. Appl. No. 17/933,324, May 2, 2023, Notice of Allowance.
U.S. Appl. No. 17/933,332, May 4, 2023, Office Action.
U.S. Appl. No. 17/933,332, Sep. 7, 2023, Notice of Allowance.
Office Action as received in Canadian application 3082023 dated Mar. 12, 2025.
U.S. Appl. No. 18/491,008, May 9, 2025, Office Action.
International Search Report & Written Opinion as received in PCT/US2025/036319 dated Sep. 5, 2025.
Examination Report as received in Australian application 2025202951 dated Jul. 4, 2025.
Notice of Acceptance as received in Australian application 2025202951 dated Aug. 12, 2025.

\* cited by examiner

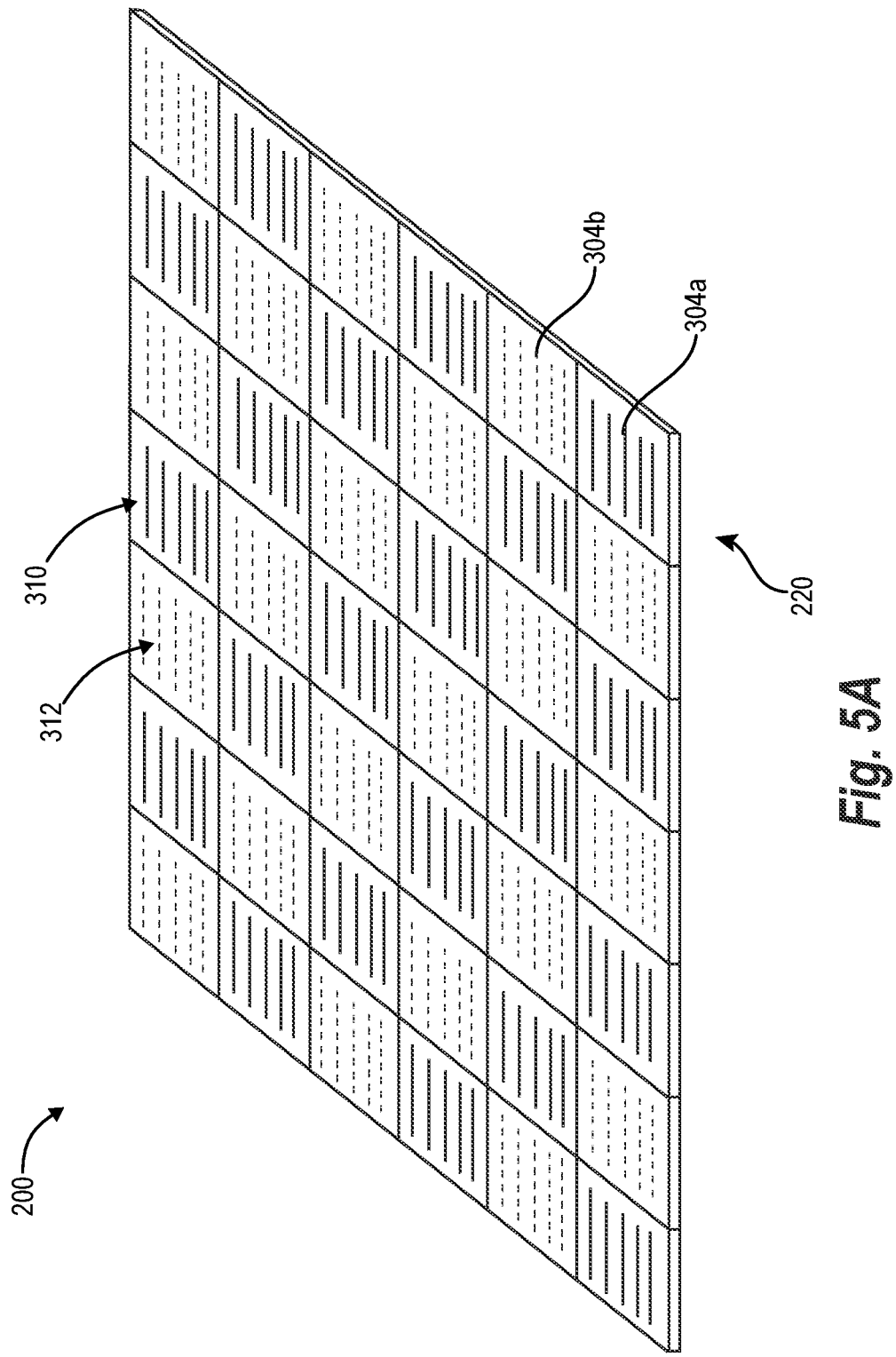

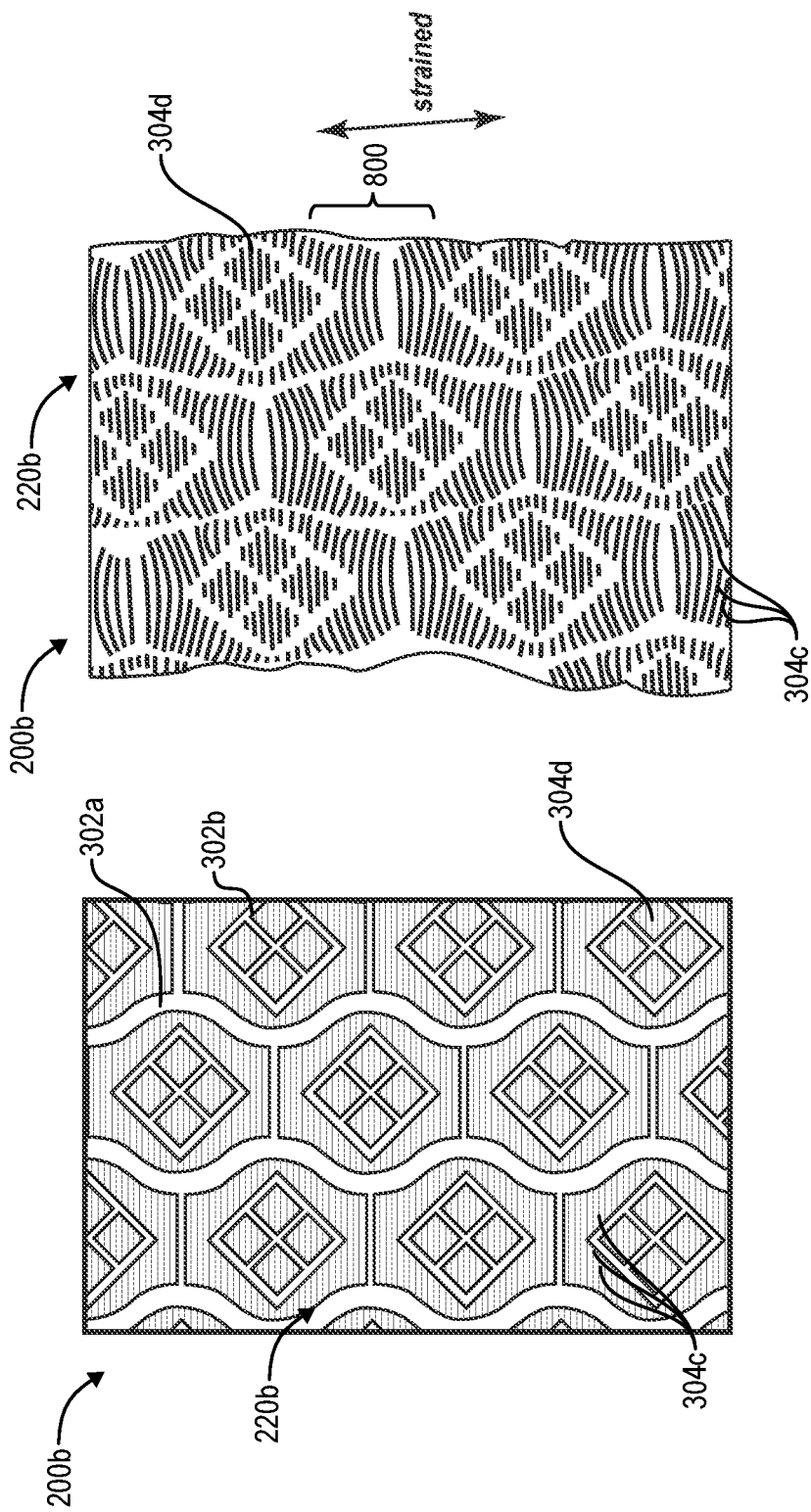

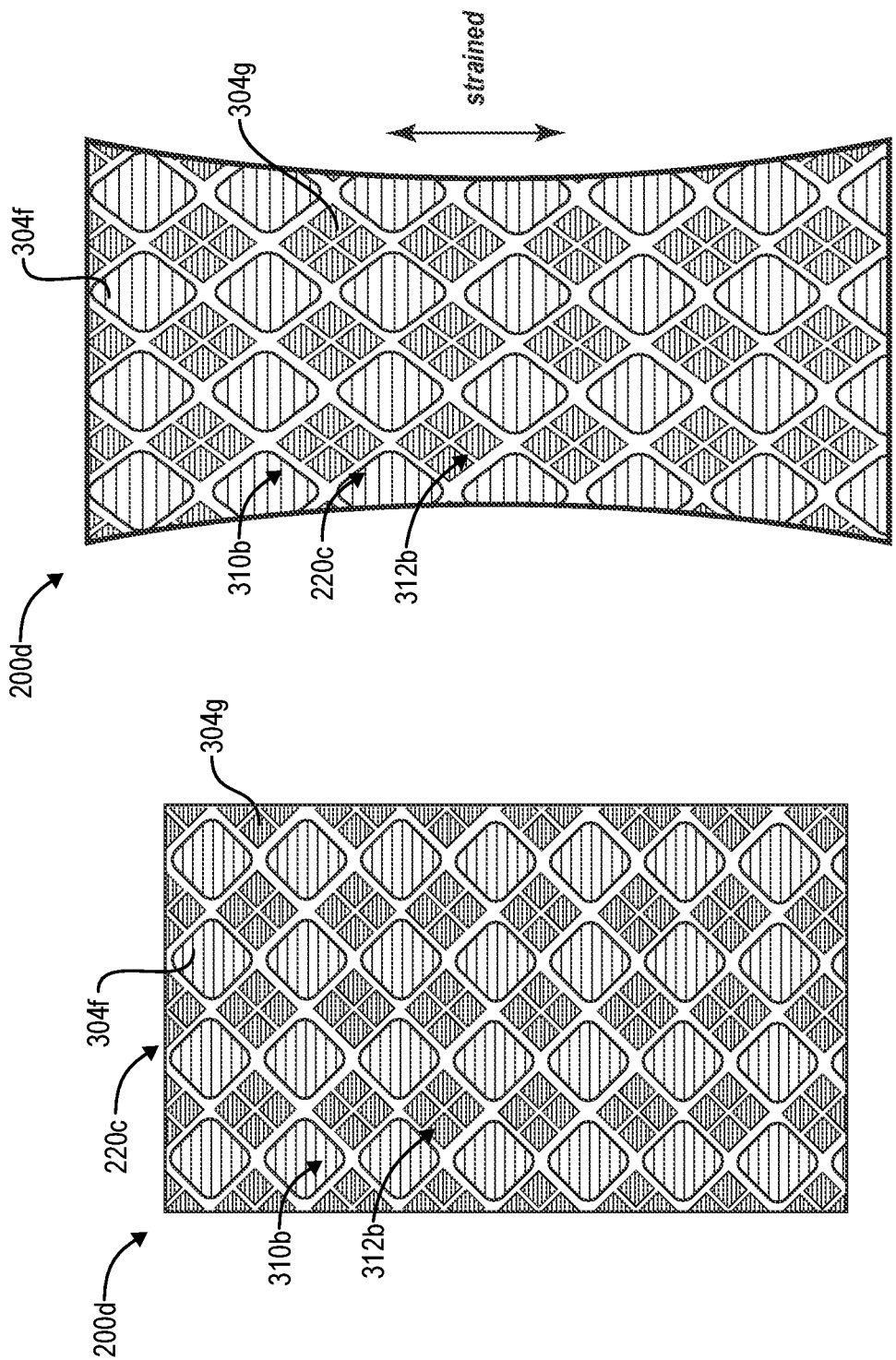

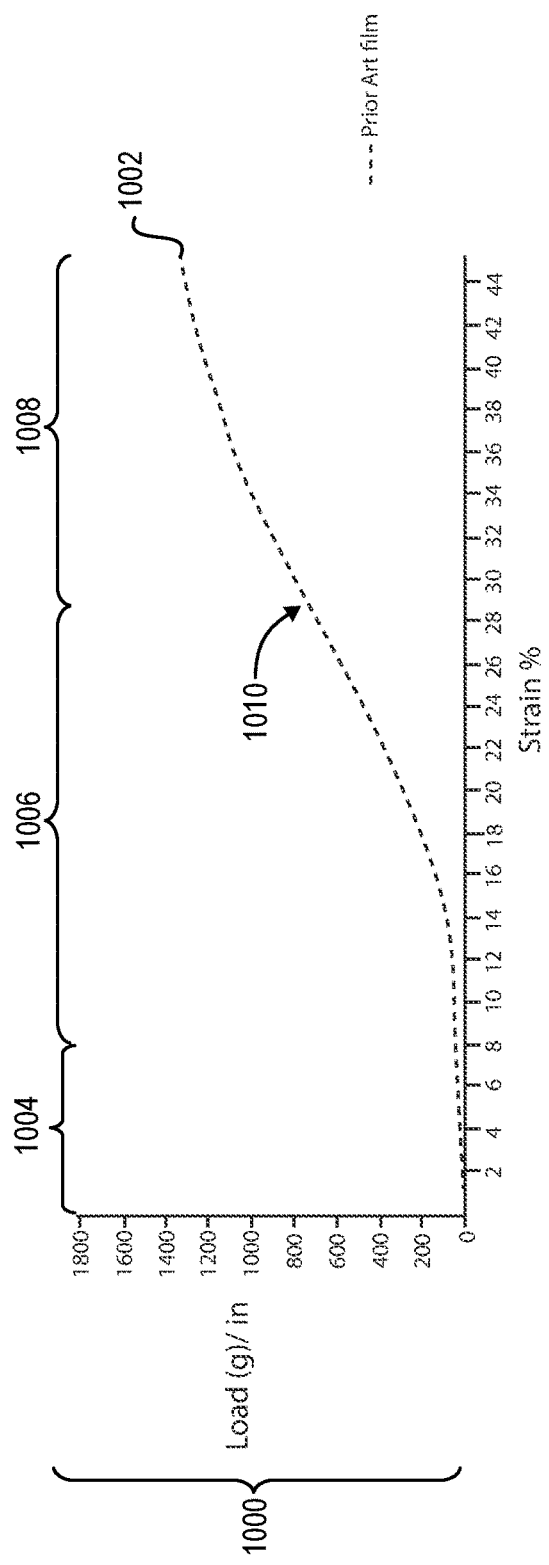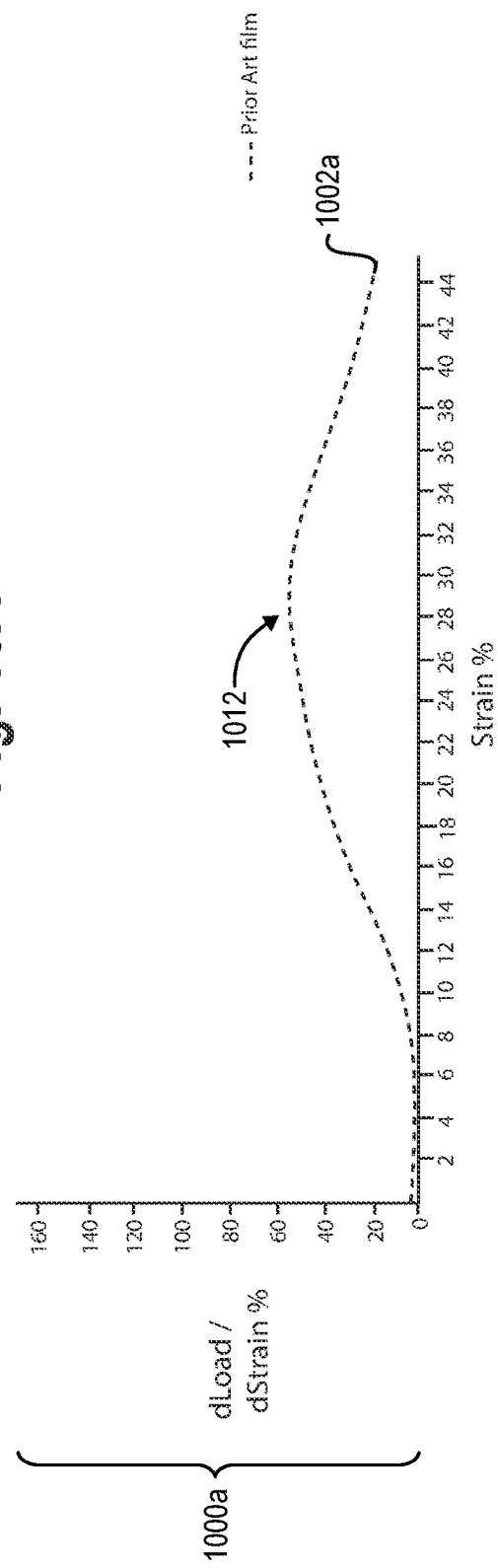

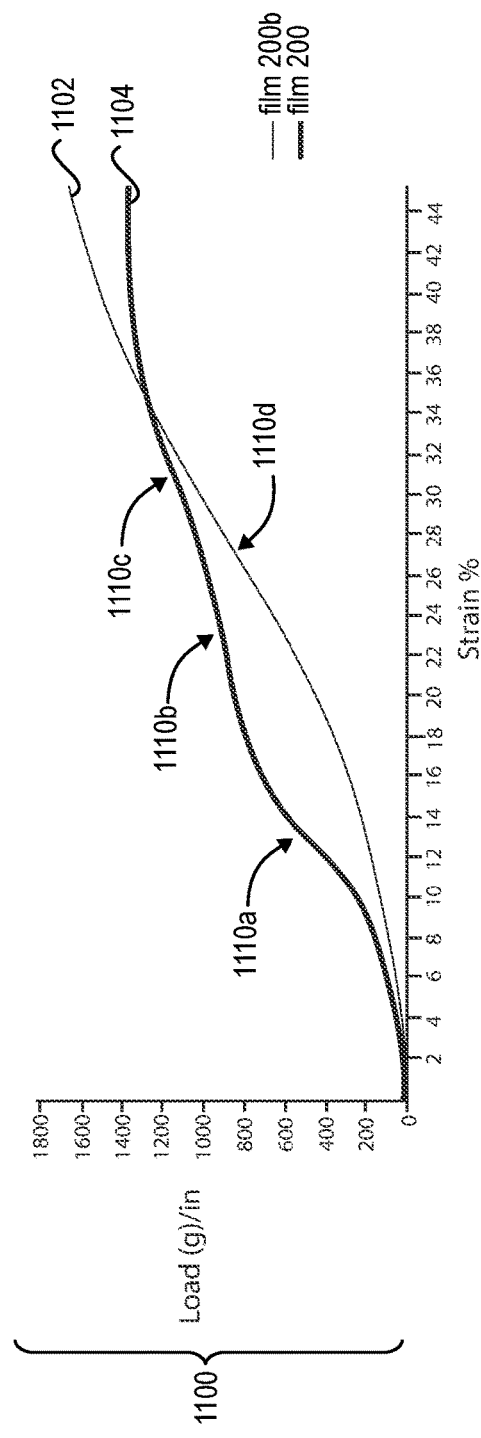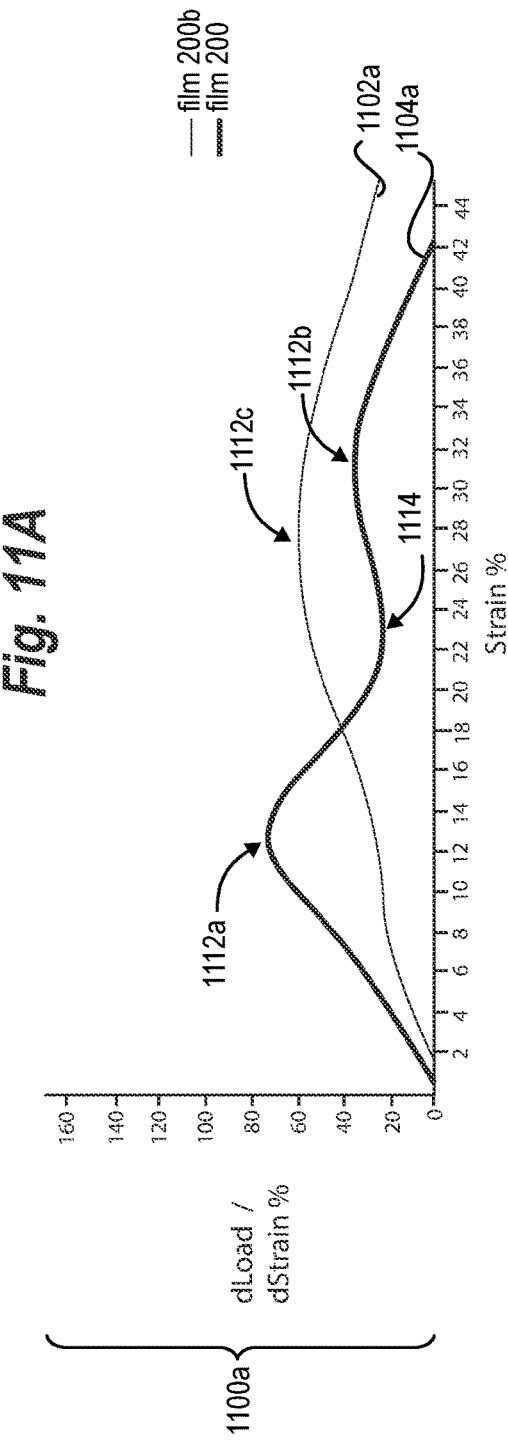
Fig. 11A
Fig. 11B

THERMOPLASTIC BAGS WITH COMPLEX STRETCH PATTERNS

CROSS-REFERENCE TO RELATED APPLICATIONS

The present application is a continuation application of U.S. patent application Ser. No. 18/491,008 filed Oct. 20, 2023, which is a continuation of U.S. patent application Ser. No. 17/933,332 filed on Sep. 19, 2022, which is a continuation of U.S. patent application Ser. No. 16/761,191 filed on May 1, 2020, which is a National Stage Entry of PCT/US2018/058998 filed on Nov. 2, 2018, which claims the benefit of and priority to U.S. Provisional Application No. 62/583,108, filed Nov. 8, 2017 and entitled: THERMOPLASTIC FILMS AND BAGS WITH COMPLEX STRETCH PATTERNS AND METHODS OF MAKING THE SAME. The contents of the above-referenced applications are hereby incorporated by reference in their entirety.

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, some attempt to control manufacturing costs by decreasing the amount of thermoplastic material in a product. One way manufacturers may attempt to reduce production costs is to stretch the thermoplastic film, thereby increasing its surface area and reducing the amount of thermoplastic film needed to produce a product of a given size.

While thinner gauge materials can represent cost savings to the manufacturer, the use of thinner gauge films can result in lower durability. Although some recent technology may, in some cases at least, result in relatively thinner gauge films that may be as strong as their thicker counterparts, customers naturally sense from prior experience that thinner gauge materials are lower in quality and durability.

For example, some cues to a customer of lower quality and durability of a film are how thick or thin the film feels and how thin or weak the film "looks." Customers tend to view thin looking or feeling films as having relatively low strength. Thus, even though some mechanisms can improve some aspects of film strength while using a thinner gauge, the look and feel of such films tend to cause customers to believe the film is nevertheless low quality.

To provide additional strength and flexibility, some manufacturers seek to provide thermoplastic films with elastic-like behavior by adding elastic materials or using specialized processing of the films. While elastic-like behavior provides various advantages, how easily a film stretches can connate to a consumer a level of strength. For example, films that stretch easily can signal to a user that the film is weak and will likely fail quickly.

Accordingly, there are various considerations to be made with regard to thermoplastic films and products formed therefrom.

BRIEF SUMMARY

One or more implementations of the present disclosure solve one or more problems in the art with thermoplastic films with complex stretch patterns and apparatus and methods for creating the same. The complex stretch patterns provide visual and tactile cues as the films are stretched/elongated. In one or more implementations, the complex stretch pattern causes the thermoplastic film to have a complex stretch profile. For example, one or more implementations include thermoplastic films having stretch profiles with multiple inflection points. Additionally, one or more implementations of the present disclosure include a thermoplastic film that billows when stretched/elongated and subsequently released to provide the film with greater loft.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied load, a stretch profile of the thermoplastic film has a complex shape. For example, in one or more implementations, the thermoplastic film has: a stretch profile that includes multiple inflection points, a stretch profile having a derivative with a positive slope in an initial elongation zone, and/or a stretch profile having a derivative with that does not consist of a bell shape. Additional implementations include bags having sidewalls formed from such a film and methods of making such films and bags.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied load and during an initial elongation zone from zero percent to five percent, the thermoplastic film undergoes both geometric and molecular deformation. Additional implementations include bags having sidewalls formed from such a film and methods of making such films and bags.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied load, the thermoplastic film undergoes multiple phases in which a major portion of a deformation of the thermoplastic film is geometric deformation. Additional implementations include bags having sidewalls formed from such a film and methods of making such films and bags.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied and subsequently released load, billows are formed in the thermoplastic film with one or more of heights greater than 3000 micrometers or widths greater than 3000 micrometers.

Additional implementations include bags having sidewalls formed from such a film and methods of making such films and bags.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 5A shows a partial perspective view of a film having a complex stretch pattern in the form of a checkerboard pattern according to one or more implementations of the present disclosure;

FIG. 8A shows a front view of a film having a complex stretch pattern in the form of elongated bulbs with enclosed diamonds according to one or more implementations of the present disclosure;

FIG. 8B shows a front view of the film of FIG. 8A after having been subjected to an applied, and subsequently released, strain according to one or more implementations of the present disclosure;

FIG. 9A shows a front view of a film with a complex stretch pattern in the form of micro and macro diamond patterns according to one or more implementations of the present disclosure;

FIG. 9B shows a front view of the film of FIG. 9A after having been subjected to an applied, and subsequently released, strain according to one or more implementations of the present disclosure;

FIG. 10A shows a graph representing a stretch profile of a conventional SELF' d film;

FIG. 10B shows a graph representing a derivative of the stretch profile of FIG. 10A;

FIG. 11A shows a graph representing stretch profiles of two films with complex stretch patterns according to one or more implementations of the present disclosure;

FIG. 11B shows a graph representing derivatives of the stretch profiles of FIG. 11A;

DETAILED DESCRIPTION

Figure 1A:
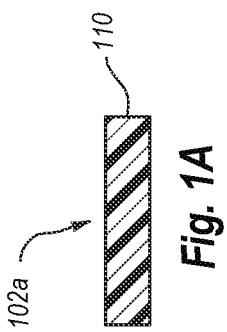
FIGS. 1A-1C show partial side cross-sectional views of films having varying numbers of sublayers according to one or more implementations of the present disclosure.

One or more implementations of the present disclosure include thermoplastic films with complex structural elastic-like film (SELF) patterns. As described below, the complex stretch or SELF patterns provide the thermoplastic films, and products made therefrom, with various advantages. For example, the complex SELF patterns can provide tactile and visual cues of strength/quality as the films are elongated, subjected to a load, or otherwise stretched.

One or more implementations include thermoplastic films with strainable networks created by SELF'ing process. The strainable network can comprise a plurality of raised rib-like elements extending in a direction perpendicular to a main surface of the thermoplastic film. The raised rib-like elements are surrounded by a plurality of web areas. The raised rib-like elements and web areas can comprise a stainable network that provides the thermoplastic film with an elastic-like behavior. In particular, when subjected to an applied load, the raised rib-like elements can initially undergo a substantially geometric deformation before undergoing substantial molecular-level deformation when subjected to an applied load. On the other hand, the web areas can undergo a substantially molecular-level and geometric deformation in response to the applied strain. U.S. Pat. Nos. 5,518,801 and 5,650,214 each disclose processes for forming strainable networks using SELF'ing processes. The contents of each of the aforementioned patents are incorporated in their entirety by reference herein.

In addition to the elastic-like characteristics mentioned above and the other benefits described in the above incorporated patents, implementations of the present disclosure include sized and positioned strainable networks in complex patterns that provide previously unrealized film properties and characteristics. For example, one or more implementations include sizing and positioning the plurality of raised rib-like elements and the plurality of web areas such that, when subjected to an applied load, a stretch profile of the thermoplastic film has a complex shape. As used herein, a stretch profile refers to how a film elongates when subjected to an applied load. A stress-strain curve or a stress-elongation curve shows a thermoplastic film's stretch profile. Details on creating a stress-elongation curve are provided below. Non-limiting examples of complex stretch profiles or stretch profiles with a complex shape include stretch profiles with multiple inflection points, stretch profiles having a derivative with a positive slope in an initial elongation zone, and stretch profiles having a derivative with that does not consist of a bell shape. Each of the complex stretch profiles mentioned above can provide various benefits, such as tactile feedback to a user that indicates strength, resistance to elongation, or multi-stage geometric elongation as explained in greater detail below.

Additionally, one or more implementations include sizing and positioning the plurality of raised rib-like elements and the plurality of web areas such that, when subjected to an applied load, the thermoplastic film undergoes both geometric and molecular deformation in an initial elongation zone. The combined geometric and molecular deformation can provide a resistance to stretching that builds at a faster rate than conventional films with strainable networks created by a SELF'ing process. This initial resistance to stretching can provide customers a sensory feedback and signal strength.

Furthermore, one or more implementations include sizing and positioning the plurality of raised rib-like elements and the plurality of web areas such that, when subjected to an applied load, the thermoplastic film experiences multiple distinct phases in which a major portion of the deformation is geometric deformation. For example, the plurality of the raised rib-like elements can be arranged in multiple patterns comprising differs shapes and differing sizes of raised rib-like elements. The multiple distinct phases in which a major portion of the deformation is geometric deformation can be due at least in part to the differing configurations of the patterns of the raised rib-like elements undergoing geometric deformation at differing points during elongation of the thermoplastic film. The distinct phases in which a major portion of the deformation is geometric deformation can comprise phases in which less force is needed to elongate the thermoplastic film than a force in an immediate adjacent phase of elongation. The distinct phases in which a major portion of the deformation is geometric deformation provides the film with a lessened resistance to stretching in differing phases. This varying resistance to stretching can provide customers a sensory feedback and signal strength. As used herein "major" refers to a non-negligible amount that meaningfully contributes to an affect. For example, "major" can comprise an amount (percentage) from about 20% to 100%. In one or more embodiments, major is 30%, 40%, 50% or more than 50%. As used herein "dominate" refers to an amount that provides the majority of an affect. Thus, dominate comprise percentages greater than 50%.

Additionally, one or more implementations include sizing and positioning the plurality of raised rib-like elements and the plurality of web areas such that, when subjected to an applied and subsequently released load, billows form in the thermoplastic film. In some implementations, the billows may give the film a thicker and stronger appearance in comparison to conventional films while utilizing a same amount of material. Furthermore, billows can provide an increased perception of stretch performance in comparison to conventional films. In one or more embodiments, the billows have one or more of heights greater than 3000 micrometers or widths greater than 3000 micrometers.

One or more implementations of the present disclosure include products made from or with such thermoplastic films with complex SELF patterns. For example, such products include, but are not limited to, grocery bags, trash bags, sacks, and packaging materials, feminine hygiene products, baby diapers, adult incontinence products, or other products. For ease in description, the figures and bulk of the following disclosure focuses on films and bags. One will appreciate that teachings and disclosure equally applies to other products.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly (ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; p=0.920). Additionally, other examples use a gas phase LLDPE, which is a hexene gas phase LLDPE formulated with slip/AB (MI=1.0; p=0.920). Still further examples use a gas phase LLDPE, which is a hexene gas phase LLDPE formulated with slip/AB (MI=1.0; p=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-layer film may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1B:
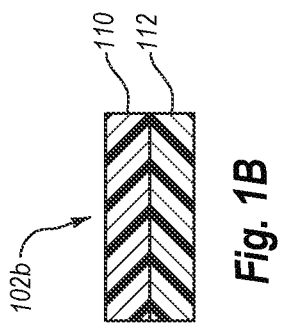
Figure 1C:
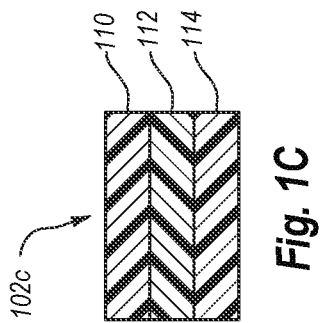

Films having a complex stretch pattern can may include a single film formed from one, two, three, or more layers of thermoplastic material. FIGS. 1A-1C are partial cross-sectional views of multi-layer films into which a complex stretch pattern can be formed. Such films can then be used to form products, such as a thermoplastic bag. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

Figure 2:
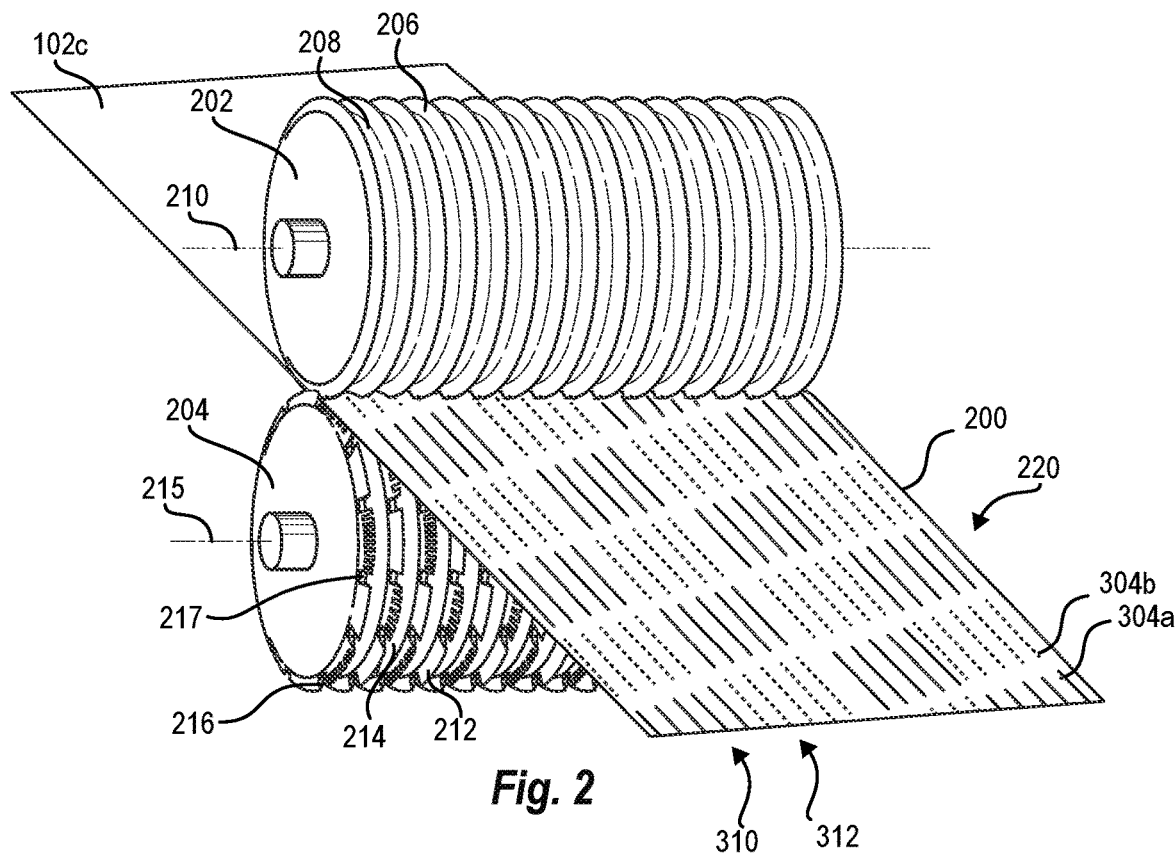
FIG. 2 shows a perspective view of a pair of SELF'ing rollers utilized to form complex stretch patterns in films according to one or more implementations of the present disclosure.

FIG. 2 shows a pair of SELF'ing intermeshing rollers 202, 204 (e.g., a first SELF'ing intermeshing roller 202 and a second SELF'ing intermeshing roller 204) for creating strainable networks with complex patterns. As shown in FIG. 2, the first SELF'ing intermeshing roller 202 may include a plurality of ridges 206 and grooves 208 extending generally radially outward in a direction orthogonal to an axis of rotation 210. As a result, the first SELF'ing intermeshing roller 202 can be similar to a transverse direction ("TD") intermeshing roller such as the TD intermeshing rollers described in U.S. Pat. No. 9,186,862 to Broering et al., the disclosure of which is incorporated in its entirety by reference herein. The second SELF'ing intermeshing roller 204 can also include a plurality of ridges 212 and grooves 214 extending generally radially outward in a direction orthogonal to an axis of rotation 215. As shown in FIG. 2, in some embodiments, the ridges 212 of the second SELF'ing intermeshing roller 204 may include a plurality of notches 217 that define a plurality of spaced teeth 216.

As shown by FIG. 2, passing a film, such as film 102c, through the SELF' ing intermeshing rollers 202, 204 can produce a thermoplastic film 200 with one or more strainable networks formed by a structural elastic like process in which the strainable networks have a complex pattern 220 in the form of a checkerboard pattern. As used herein, the term "strainable network" refers to an interconnected and interrelated group of regions which are able to be extended to some useful degree in a predetermined direction providing the web material with an elastic-like behavior in response to an applied and subsequently released elongation.

Figure 3:
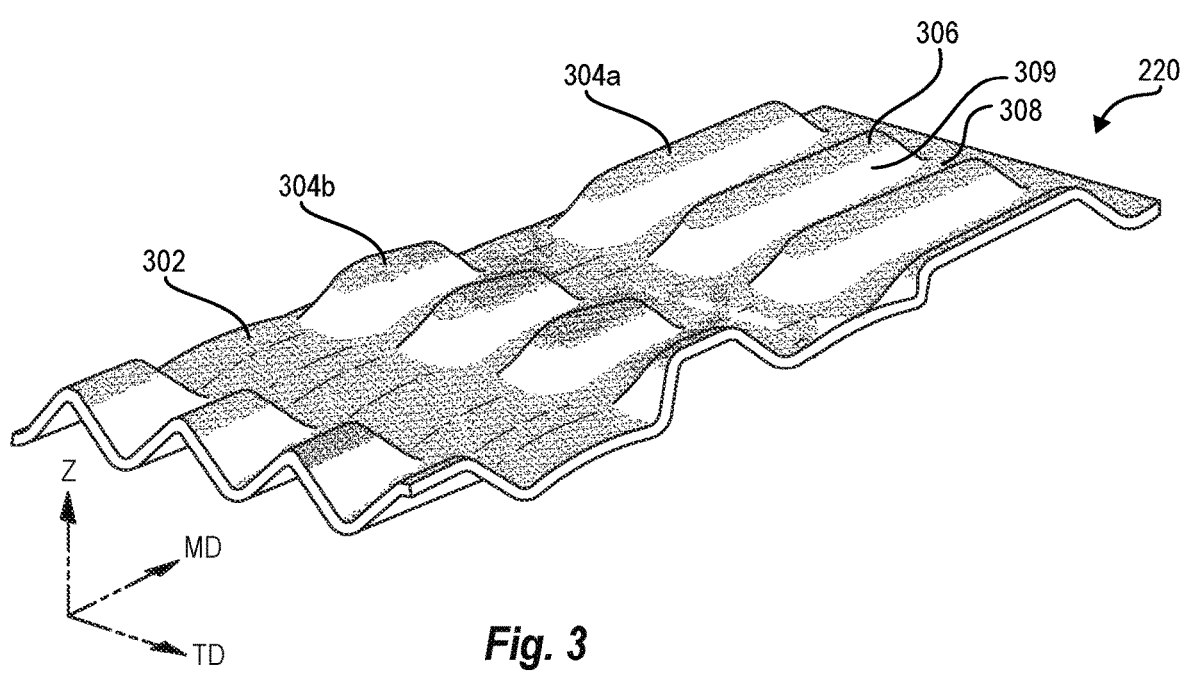
FIG. 3 shows a perspective view of a SELF'ed film having a complex stretch pattern according to one or more implementations of the present disclosure.

FIG. 3 shows a portion of the thermoplastic film 200 with the complex stretch pattern 220. Referring to FIGS. 2 and 3 together, as film (e.g., multi-layer film 102c) passes through the SELF'ing intermeshing rollers 202, 204, the teeth 216 can press a portion of the film out of plane defined by the film to cause permanent deformation of a portion of the film in the Z-direction. For example, the teeth 216 can intermittently stretch a portion of the film 102c in the Z-direction. The portions of the film 102c that pass between the notched regions 217 of the teeth 216 will remain substantially unformed in the Z-direction. As a result of the foregoing, the thermoplastic film 200 with the complex stretch pattern 220 includes a plurality of isolated deformed, raised, rib-like elements 304a/304b and at least one un-deformed portion (or web area) 302 (e.g., a relatively flat region). As will be understood by one of ordinary skill in the art, the length and width of the rib-like elements 304a/304b depend on the length and width of teeth 216 and the speed and the depth of engagement of the intermeshing rollers 202, 204. The rib-like elements 304a/304b and the un-deformed web areas 302 form a strainable network.

As shown in FIG. 3, the strainable network of the film 200 can include first thicker regions 306, second thicker regions 308, and stretched, thinner transitional regions 309 connecting the first and second thicker regions 306, 308. The first thicker regions 306 and the stretched, thinner regions 309 can form the raised rib-like elements 304a/304b of the strainable network. In one or more embodiments, the first thicker regions 306 are the portions of the film with the greatest displacement in the Z-direction. In one or more embodiments, because the film is displaced in the Z-direction by pushing the rib-like elements 304a/304b in a direction perpendicular to a main surface of the thermoplastic film (thereby stretching the regions 309 upward) a total length and width of the film does not substantially change when the film is subjected to the SELF'ing process of one or more embodiments of the present invention. In other words, the film 102c (film prior to undergoing the SELF'ing process) can have substantially the same width and length as the film 200 resulting from the SELF'ing process.

As shown by FIG. 3, the rib-like elements can have a major axis and a minor axis (i.e., the rib-like elements are elongated such that they are longer than they are wide). As shown by FIGS. 2 and 3, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

The rib-like elements 304a/304b can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying the such a film are subjected to an applied load or force. Types of geometric deformation include, but are not limited to bending, unfolding, and rotating.

Thus, upon application of a force, the rib-like elements 304a/304b can undergo geometric deformation before undergoing molecular-level deformation. For example, a strain applied to the film 200 in a perpendicular direction to the major axes of the rib-like elements 304a/304b can pull the rib-like elements 304a/304b back into plane with the web areas 302 prior to any molecular-level deformation of the rib-like elements 304. Geometric deformation can result in significantly less resistive forces to an applied strain than that exhibited by molecular-level deformation.

As mentioned above, the rib-like elements 304a/304b and the web areas 220 can be sized and positioned so as to create a complex stretch pattern. The complex stretch pattern can provide one or more of the benefits discussed herein. For example, the complex stretch pattern can cause a film (when subjected to an applied load) to have or exhibit one or more of: a stretch profile with a complex shape, both geometric and molecular deformation in an initial elongation zone (i.e., from zero percent to five percent elongation), multiple phases in which a major portion of a deformation of the thermoplastic film is geometric deformation, a stretch profile that includes multiple inflection points, a derivative of a stretch profile with a positive slope in an initial elongation zone, or billows with one or more of heights greater than 3000 micrometers or widths greater than 3000 micrometers.

As shown by FIGS. 2 and 3, groups of rib-like elements 304a/304b can be arranged in different arrangements to form a complex stretching pattern. For example, a first plurality of raised rib-like elements 304a can be arranged in a first pattern 310 and a second plurality of raised rib-like elements 304b arranged in a second pattern 312. The first and the second patterns 310, 312 of raised rib-like elements 304a, 304b can repeat across the thermoplastic film 200. As shown by FIG. 2, first and the second patterns 310, 312 of raised rib-like elements 304a, 304b can form a checkerboard pattern 220.

In one or more implementations, the first pattern 310 is visually distinct from the second pattern 312. As used herein, the term "visually distinct" refers to features of the web material which are readily discernible to the normal naked eye when the web material or objects embodying the web material are subjected to normal use.

In one or more embodiments, the first pattern 310 of raised rib-like elements 304a comprises a macro pattern while the second pattern 312 of raised rib-like elements 304b comprises a micro pattern. As used herein a macro pattern is a pattern that is larger in one or more ways than a micro pattern. For example, as shown by FIG. 2, the macro pattern 310 has larger/longer raised rib-like elements 304a than the raised rib-like elements 304b of the micro pattern 312. In alternative embodiments, the surface area of a given macro pattern 310 covers more surface area than a surface area covered by a given micro pattern 312. In still further embodiments, a macro pattern 310 can include larger/wider web portions between adjacent raised rib-like elements than web portions between adjacent raised rib-like elements of a micro pattern 312.

As mentioned above, the raised rib-like elements 304a are longer than the raised rib-like elements 304b. In one or more embodiments, the raised rib-like elements 304a have a length at least 1.5 times the length of the raised rib-like elements 304b. For example, the raised rib-like elements 304a can have a length between 1.5 and 20 times the length of the raised rib-like elements 304b. In particular, the raised rib-like elements 304a can have a length 2, 3, 4, 5, 6, 8, or 10 times the length of the raised rib-like elements 304b.

Figure 4:
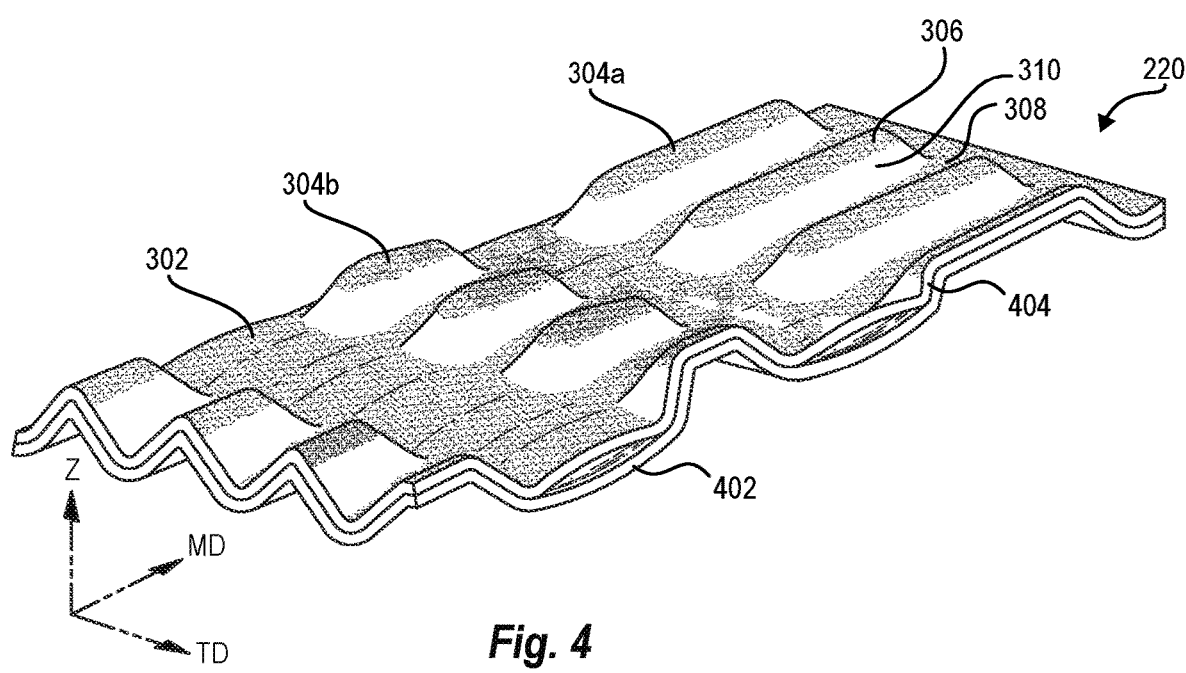
FIG. 4 shows a perspective view of a multi-layer SELF'ed film having a complex stretch pattern according to one or more implementations of the present disclosure.

In one or more implementations, the films with a complex stretch pattern may comprise two or more distinct thermoplastic films (i.e., two films extruded separately). The distinct thermoplastic films can be non-continuously bonded to one another. For example, in one or more embodiments two film layers can be passed together through a pair of SELF'ing rollers to produce a multi-layered lightly-bonded laminate film 200a with the complex stretch pattern 220, as shown in FIG. 4. The multi-layered lightly-bonded laminate film 200a can comprise a first thermoplastic film 402 partially discontinuously bonded to a second thermoplastic film 404. In one or more embodiments, the bonds between the first thermoplastic film 402 and the second thermoplastic film 404 are aligned with the first thicker regions 306 and are formed by the pressure of the SELF'ing rollers displacing the raised rib-like elements 304a, 304b. Thus, the bonds can be parallel to the raised rib-like elements 304a, 304b and be positioned between raised rib-like elements 304a, 304b of the first thermoplastic film 402 and the second thermoplastic film 404.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of co-extruded multilayer films comprising one or more tie layers. As a verb, "laminate" means to affix or adhere (by means of, for example, adhesive bonding, pressure bonding, ultrasonic bonding, corona lamination, static bonds, cohesive bonds, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

In one or more embodiments, the first and second films 402, 404 may be discontinuously bonded together via one or more of the methods of bonding films together as described in U.S. Pat. No. 8,603,609, the disclosure of which is incorporated in its entirety by reference herein. In particular, the first and second films 402, 404 may be bonded via one or more of MD rolling, TD rolling, DD ring rolling, SELF'ing, pressure bonding, corona lamination, adhesives, or combinations thereof. In some implementations, the first and second films 402, 404 may be bonded such that the bonded regions have bond strengths below a strength of the weakest film of the first and second films 402, 404. In other words, the bonded regions may fail (e.g., break apart) before the first or second films 402, 404 fail. As a result, discontinuously bonding the first and second films 402, 404 may can also increase or otherwise modify one or more of the tensile strength, tear resistance, impact resistance, or elasticity of the films. Furthermore, the bonded regions between the first and second films 402, 404 may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 402, 404 together results in un-bonded regions and bonded regions between the first and second films 402, 404. For example, discontinuously bonding the first and second films 402, 404 together may result in un-bonded regions and bonded regions as described in the U.S. Pat. No. 9,637,278, the disclosure of which is incorporated in its entirety by reference herein.

Figure 5B:
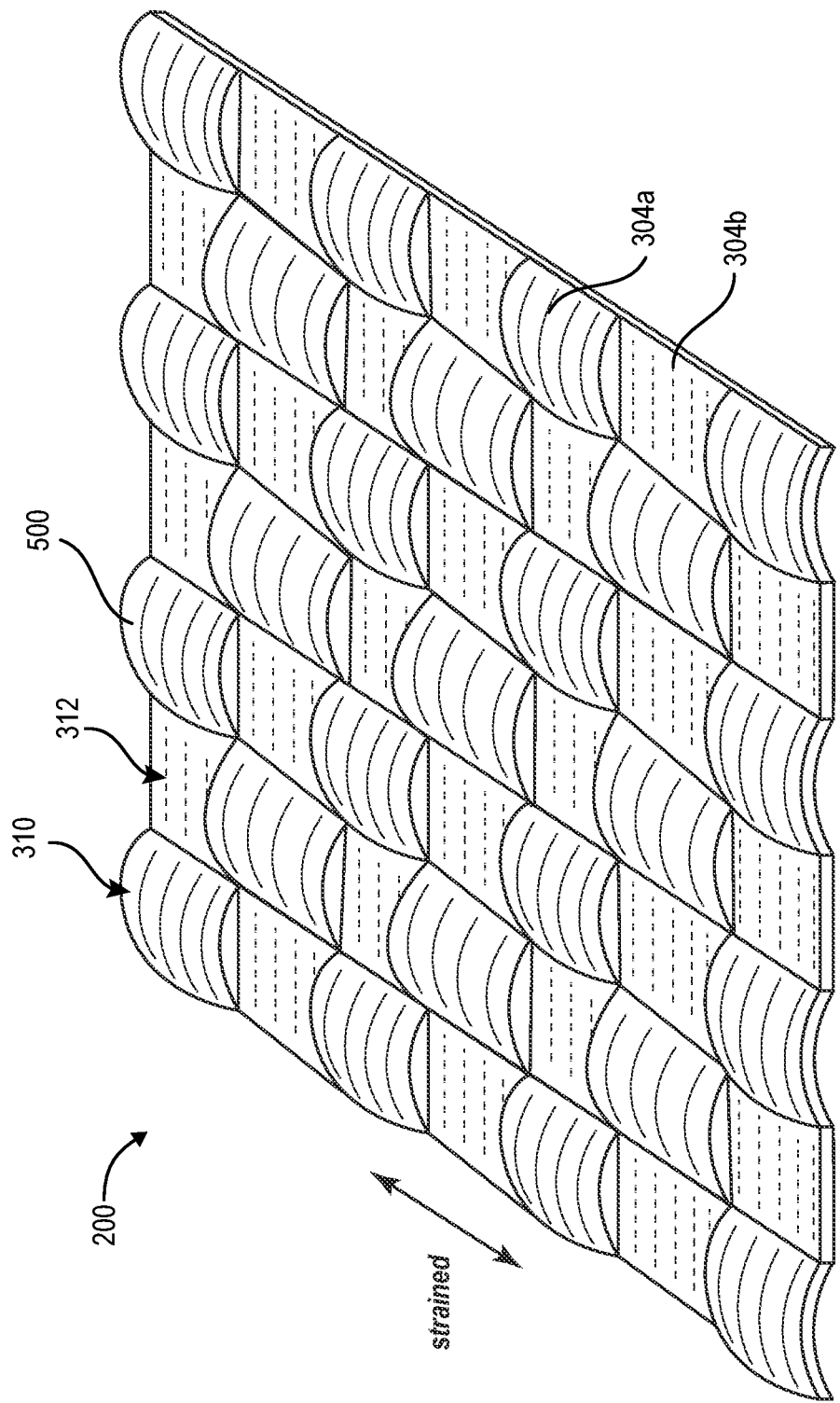
FIG. 5B shows a partial perspective view of the film of FIG. 5A after having been subjected to an applied, and subsequently released, load according to one or more implementations of the present disclosure.
Figure 5C:
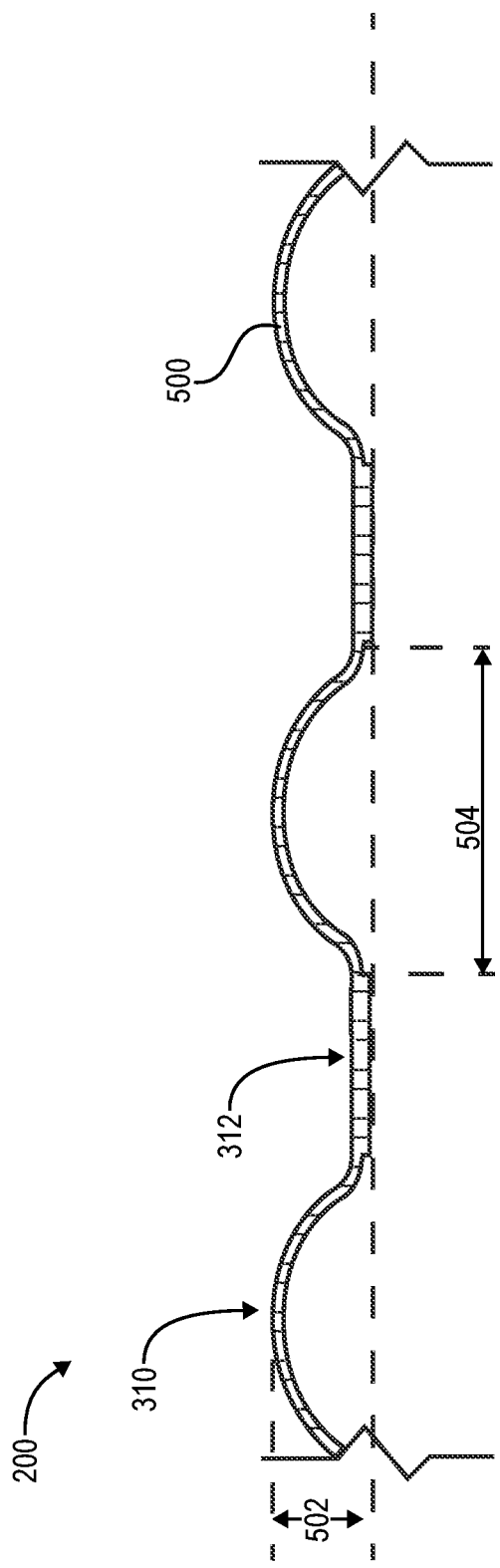
FIG. 5C shows a partial side cross-sectional view of the film of FIG. 5B.

Additional details of the benefits of a complex stretch pattern will be described in relation to FIGS. 5A-5C. FIG. 5A is a perspective view of a portion of the thermoplastic film 200 with the complex stretch pattern 220 in an unstrained configuration (i.e., prior to being subjected to an applied load). FIG. 5B is a perspective view of a portion of the thermoplastic film 200 with the complex stretch pattern 220 after having been strained (i.e., after having been subjected to an applied and subsequently released load). FIG. 5C on the other hand illustrates a cross sectional view of a portion of the thermoplastic film 200 with the complex stretch pattern 220 after having been strained.

As shown, after the load is released the thermoplastic film 200 returns, to a substantial degree, to its condition prior to being subjected to the load. As shown by a comparison of FIGS. 5A-5C, in some implementations, when subjected to an applied and subsequently released load, billows 500 are formed in the thermoplastic film 200. The billows 500 may at least partially extend outward from the plane of the thermoplastic film 200 and may form a protruding shape. For example, the billows 500 may have a general square dome shape (i.e., a dome having a square base). One will appreciate that the configuration of the billows 500 can be based on a given complex stretch pattern.

As used herein the term "billow" refers to the puckering of a thermoplastic film such that the thermoplastic film does not lie in a planar position. As shown by FIG. 5C, the billows 500 can comprise a height 502 and a width 504. The height 502 is measured at the farthest point in the Z-direction from a base of the billow 500. In one or more embodiments, the billows 500 have one or more of average heights 502 greater than 3000 micrometers or average widths 504 greater than 3000 micrometers. More particularly, the billows 500 can be between 4000 and 16000 micrometers in width and between 3000 and 5000 micrometers in height.

In some implementations, the height 502 is within a range of about 2800 lam to about 3600 µm. In additional implementations, the height 502 is within a range of about 3000 lam to about 3400 µm. In yet further implementations, the height 502 is about 3200 µm. In some instances, the width 504 may be within the range of about 8000 lam to about 14500 µm. In additional implementations, the width 504 may be within the range of about 8400 lam to about 14000 µm.

As noted above, the billows can increase a height of the film or, in other words, provide the film with loft. For example, an activated film with complex stretch pattern (SELF' ed and then strained film) can have height that is 100 to 350 times the original gauge of the film (i.e., gauge prior to passing through the SELF'ing rollers). In one or more embodiments, an activated film with complex stretch pattern can have a height that is 125 to 350 times the original gauge of the film, a height that is 150 to 250 times the original gauge of the film, a height that is 175 to 250 times the original gauge of the film, a height that is 200 to 250 times the original gauge of the film, or a height that is 225 to 250 times the original gauge of the film.

The original rib-like elements of one or more embodiments of a film with a complex stretch pattern can comprise a height of about 1.50 millimeters to about 3.00 millimeters. Thus, upon activation a loft or height of a film with a complex stretch pattern can have a height that is 1.2 to 15.0 times the original gauge of the film, a height that is 1.5 to 12.0 times the original gauge of the film, a height that is 2.6 to 10.6 times the original gauge of the film, a height that is 5.3 to 10.6 times the original gauge of the film, or a height that is 5 to 7.5 times the original gauge of the film.

Furthermore, implementations of the present invention allow for tailoring (e.g., increasing) of the loft of a film independent of the basis weight (amount of raw material) of the film. Thus, one or more implementations can provide films with increased loft despite a reduction in thermoplastic material. As such, one or more implementations can reduce the material needed to produce a product while maintaining or increasing the loft of the film.

As shown in FIG. 5B, the billows 500 are in areas of the thermoplastic film comprising the first pattern 310 (e.g., macro pattern) of raised rib-like elements while areas comprising the second pattern 312 (e.g., micro pattern) of raised rib-like elements lack billows with heights greater than 3000 micrometers. Thus, the areas of the thermoplastic film comprising the first pattern 310 of raised rib-like elements can have a first resistance to stretching. The areas of the thermoplastic film comprising the second pattern 312 of raised rib-like elements can have a second resistance to stretching that is greater than the first resistance to stretching.

Additionally, the billows 500 (e.g., areas of the thermoplastic film comprising the first pattern 310 of raised rib-like elements) have a first visual characteristic. The un-billowed areas (e.g., areas of the thermoplastic film comprising the second pattern 312 of raised rib-like elements) have a second visual characteristic that differs from the first visual characteristic. For example, the billows 500 can have a different color, sheen, haze, transparency, refractivity, etc. The differing visual characters can cause the billows to pop or otherwise visually stand out.

Figure 6A:
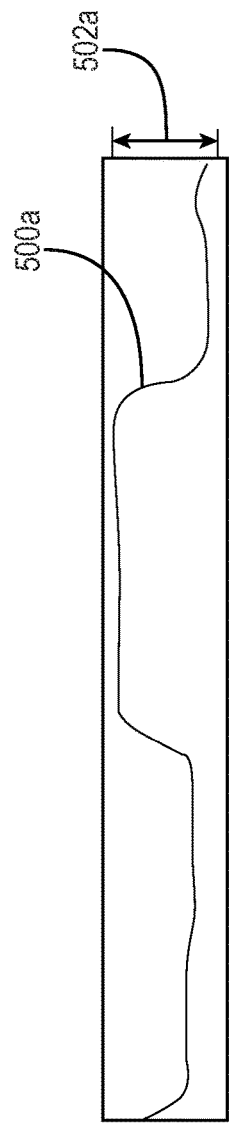
FIG. 6A illustrates a profile, taken from a micro-photograph, of a film with a complex stretch pattern after having been subjected to an applied, and subsequently released, strain according to one or more implementations of the present disclosure.
Figure 6B:
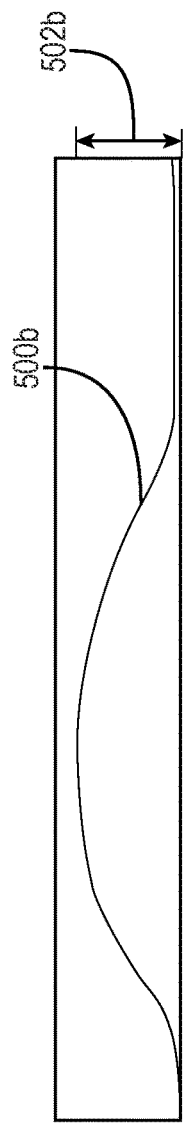
FIG. 6B illustrates a profile, taken from a micro-photograph, of another film with a complex stretch pattern after having been subjected to an applied, and subsequently released, strain according to one or more implementations of the present disclosure.
Figure 6C:
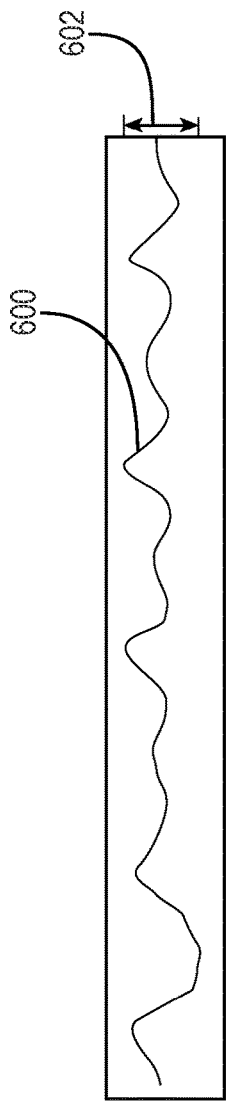
FIG. 6C illustrates a profile, taken from a micro-photograph, of a prior-art SELF'ed film after having been subjected to an applied, and subsequently released, strain according to one or more implementations of the present disclosure.

While FIG. 5C illustrates a conceptual view of the billows 500, FIGS. 6A and 6B illustrate actual cross-sections of billows 500a, 500b of thermoplastic films with complex stretch patterns. FIG. 6C on the other hand shows a cross-section of a conventionally SELF'ed film with conventional billows 600. In particular, FIG. 6C shows a cross-section of a conventionally SELF'ed film with rib-like elements in a diamond patterns as described in U.S. Pat. No. 5,650,214. As shown, thermoplastic films with complex stretch patterns can have billows 500a, 500b that have heights 502a, 502b that are between 1.2 and 3.5 times the height 602 of billows 600 of conventionally SELF'ed films. Similarly, as shown, thermoplastic films with complex stretch patterns can have billows 500a, 500b that have widths that are between 2 and 6 times the width of billows 600 of conventionally SELF'ed films.

Figure 7B:
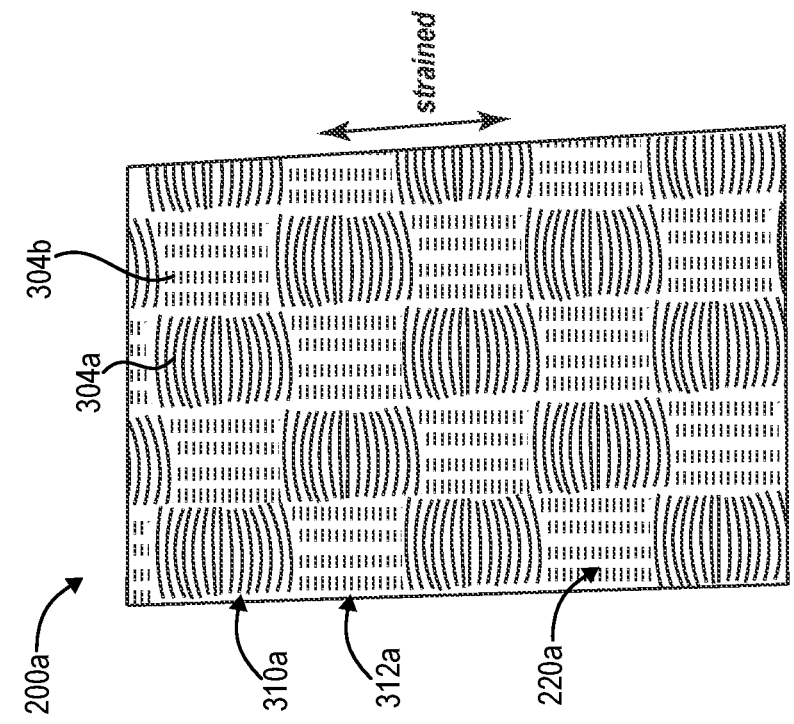
FIG. 7B shows a front view of the film of FIG. 7A after having been subjected to an applied, and subsequently released, strain according to one or more implementations of the present disclosure.
Figure 7A:
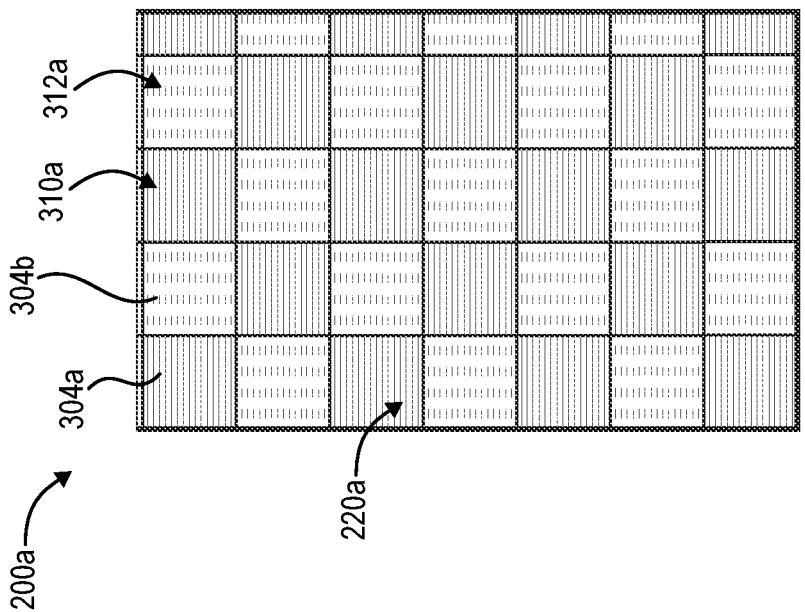
FIG. 7A shows a front view of a film having a complex stretch pattern in the form of a checkerboard pattern according to one or more implementations of the present disclosure.

FIG. 7A is a top view of a portion of a thermoplastic film 200a with the complex stretch pattern 220a prior to being subjected to an applied load. FIG. 7B is a view of the portion of the thermoplastic film 200a with the complex stretch pattern 220a after having been strained (i.e., after having been subjected to an applied and subsequently released load). As shown, the raised rib-like elements 304a of the strained thermoplastic film 200a can be strained to a greater extent than the raised rib-like elements 304b. This can be due to the micro pattern 312a providing a greater resistance to stretching than the macro pattern 310a and/or the particular arrangement of the web areas between the raised rib-like elements 304a, 304b. Furthermore, the larger strain of the raised rib-like elements 304a of the macro pattern 310a can result in the billows described above.

FIG. 8A is a top view of a thermoplastic film 200b having another complex stretch pattern 220b according to another implementation of the present disclosure. FIG. 8A shows the thermoplastic film 200b prior to being subjected to an applied load. FIG. 8B is a top view of the thermoplastic film 200b of FIG. 8A after having been strained (i.e., after having been subjected to an applied and subsequently released load). Referring to FIGS. 8A and 8B together, the thermoplastic film 200b may include a first plurality of raised rib-like elements 304c in a macro pattern (a bulbous pattern) and a second plurality of raised rib-like elements 304d in a micro pattern (a diamond pattern). As shown, the second plurality of raised rib-like elements 304d in the micro pattern are nested within the macro patterns. Furthermore, the thermoplastic film 200b includes web areas 302a, 302b. The web areas 302a, 302b can surround the micro and the macro patterns of raised rib-like elements. Furthermore, as shown by FIG. 8A, the web areas 302a are arranged in a sinusoidal pattern. The pattern of web areas 302a, 302b can affect how the raised rib-like elements expand and move when being strained and subsequently released.

As shown, the raised rib-like elements 304c of the strained thermoplastic film 200b can be strained to a greater extent than the raised rib-like elements 304d. This can be due to the micro pattern providing a greater resistance to stretching than the macro pattern. Additionally, the size and the configuration of the web areas 302a, 302b can affect how the thermoplastic film 200b deforms when subjected to an applied load. For example, as shown by FIG. 8A, the web areas 302a surrounding the raised rib-like elements 304c of the macro pattern can be wider than the web areas 302b surrounding the raised rib-like elements 302d of the micro pattern. Furthermore, the larger strain of the raised rib-like elements 304c of the macro pattern can result in billows described above. In particular, billows can be created in the areas 800 between the raised rib-like elements 304*d* of the micro pattern (i.e., the four diamonds) as shown by FIG. 8B.

FIG. 9A is a top view of a thermoplastic film 200*d* having another complex stretch pattern 220*c* according to another implementation of the present disclosure. FIG. 9A shows the thermoplastic film 200*d* prior to being subjected to an applied load. FIG. 9B is a top view of the thermoplastic film 200*d* of FIG. 9A after having been strained (i.e., after having been subjected to an applied and subsequently released load). Referring to FIGS. 9A and 9B together, the thermoplastic film 200*d* may include a first plurality of raised rib-like elements 304*f* in a macro pattern (a diamond pattern 310*b*) and a second plurality of raised rib-like elements 304*g* in a micro pattern (a four-square diamond pattern 312*b*). As shown, the second plurality of raised rib-like elements 304*g* in the micro pattern are surround by the macro patterns. Furthermore, the thermoplastic film 200*d* includes web areas between the raised rib-like elements 304*f*, 304*g*. The web areas can surround the micro and the macro patterns of raised rib-like elements.

As mentioned above, the complex stretch patterns described above can provide a thermoplastic film with a complex stretch profile (e.g., a stretch profile with a complex shape). In particular, one or more implementations include sizing and positioning the plurality of raised rib-like elements and the plurality of web areas such that, when subjected to an applied load, a stretch profile of the thermoplastic film has a complex shape. As used herein, a stretch profile refers to how a film elongates when subjected to an applied load. A stress-strain curve or a stress-elongation curve shows a thermoplastic film's stretch profile. Non-limiting examples of complex stretch profiles or stretch profiles with complex shapes include stretch profiles with multiple inflection points, stretch profiles having a derivative with a positive slope in an initial elongation zone, and stretch profiles having a derivative with that does not consist of a bell shape.

FIG. 10A illustrates a stretch profile 1002 for conventional SELF'ed film (i.e., a film as disclosed by U.S. Pat. No. 5,650,214. As seen in FIG. 10A, the conventional SELF'ed film exhibits elongation behavior in three stages or zones 1004, 1006, and 1008. The resistive force to elongation or stretch is significantly less in the first stage 1004. This is because in this initial elongation zone the deformation/elongation of the conventional SELF'ed film is substantially, if not entirely, geometric. In particular, the deformation/elongation in the initial elongation zone is due to the raised rib-like elements geometrically deforming or unbending/unfolding so that they extend or lengthen in the direction of the applied elongation. In particular, because the deformation is geometric, the conventional SELF'ed film offers minimal resistance to elongation.

The second elongation zone 1006 is a transition zone in which the rib-like elements are becoming aligned with the applied elongation. In the second elongation zone 1006, the conventional SELF'ed film begins to change from geometric deformation to molecular level deformation. This is illustrated by the increase resistance to elongation illustrated by the increasing slope of the stretch profile 1002. The third elongation zone begins at an inflection point 1010 in the stretch profile 1002. In the third elongation zone the film is undergoing substantially molecular level deformation. The inflection point 1010 marks a change in the stretch profile 1002 from being concave up to concave down.

Graph 1000*a* of FIG. 10B is a derivative 1002*a* of the stretch profile 1002 of FIG. 10A. As shown, the derivative 1002*a* of the stretch profile 1002 includes a local maximum 1012 that indicates the location of the inflection point 1010 of the stretch profile 1002. As shown by FIG. 10B, the derivative 1002*a* of the stretch profile 1002 has a bell shape. A bell shape is a generally concave down parabolic shape that can optionally include elongated beginning and/or ending tails. In other words, the derivative 1002*a* of the stretch profile 1002 indicates that the stretch profile 1002 has a non-complex shape.

FIG. 11A illustrates a graph 1100 showing a stretch profile 1102 of the film 200*b* with the complex stretch pattern 220*b* (see FIGS. 8A and 8B). The graph 1100 of FIG. 11A also illustrates a stretch profile 1104 of the film 200 with the complex stretch pattern 220 (see FIGS. 5A and 5B). FIG. 11B includes a graph 1100*a* illustrating a derivative 1102*a* of the stretch profile 1102. Additionally, the graph 1100*a* of FIG. 11A illustrates a derivative 1104*a* of the stretch profile 1104.

In one or more embodiments, the radius of the teeth of the SELF'ing rollers can be tailored to impact the slope of the stretch profile 1104. In particular, the sharpness of the corners of the teeth can impact transitions between raised-rib like elements, which in turn can impact when geometric and molecular deformation occurs.

As shown by FIG. 11B the derivatives 1102*a*, 1104*a* show that each of the stretch profiles 1102, 1104 have complex shapes. In particular, neither of the derivatives 1102*a*, 1104*a* consists of a bell shape. For example, derivative 1104*a* has multiple inflection extrema (local maxima and/or minima). The local extrema in the derivatives 1104*a*, 1102*a* indicate inflection points (two or more) in the stretch profiles 1102, 1104. More particularly, the derivative 1104*a* has three inflection points 1112*a*, 1112*b*, 1114—a first maximum 1112*a*, a second maximum 1112*b*, and a local minimum 1114 positioned between the first and second maxima.

In an initial elongation zone (from about 0% to about 8%) both thermoplastic films 200, 220*b* undergo both geometric and molecular deformation. This is shown by the derivatives 1102*a*, 1104*a* of the stretch profiles 1102, 1104 having a positive slope in the initial elongation zone. It will be noted that this in in contrast to the conventional SELF' ed film discussed above in relation to FIGS. 10A and 10B. Thus, the thermoplastic films 200, 220*b* with complex stretch patterns have an increase in stretch resistance in the initial elongation zone. The thermoplastic films 200, 220*b* undergo elongation in the initial elongation zone but also exhibit a resistance to elongation that builds at a faster rate than conventional SELF' ed films. This increased resistance provides a sensory feedback and a signal of strength.

In addition to the foregoing, the derivatives 1102*a*, 1104*a* indicate that the thermoplastic films 200, 220*b* with complex stretch patterns undergo multiple phases in which a major portion of a deformation of the thermoplastic film is geometric deformation. This is in contrast to conventional SELF' ed films that undergo geometric deformation in a single phase or elongation zone.

For example, the thermoplastic film with the complex stretch pattern can undergo primarily geometric deformation in an initial elongation zone or phase from 0% elongation or strain to about 8% elongation or strain. The thermoplastic film with the complex stretch pattern can then undergo primarily geometric deformation in a subsequent elongation zone from about 23% percent elongation to about 31% elongation. In some implementations, the thermoplastic film with the complex stretch pattern may exhibit multiple phases of geometric deformation due to a combination of the macro patterns of raised rib-like elements and the micro patterns of raised rib-like elements. For example, the macro patterns of raised rib-like elements may geometrically deform first when the thermoplastic film is initially subjected to a strain. The micro patterns of raised rib-like elements may geometrically deform after the macro patterns of raised rib-like elements in a different elongation zone or phase.

Furthermore, in one or more implementations, due to the two distinct geometric deformations, the thermoplastic films with the complex stretch patterns of the present disclosure may provide a more tear resistant film in comparison to conventional films. For example, because any force applied to the thermoplastic films with the complex stretch patterns must overcome two separate distinct geometric deformations prior to causing substantial molecular deformation and eventual failure, the films of the present disclosure may provide increase tear resistance.

Figure 12:
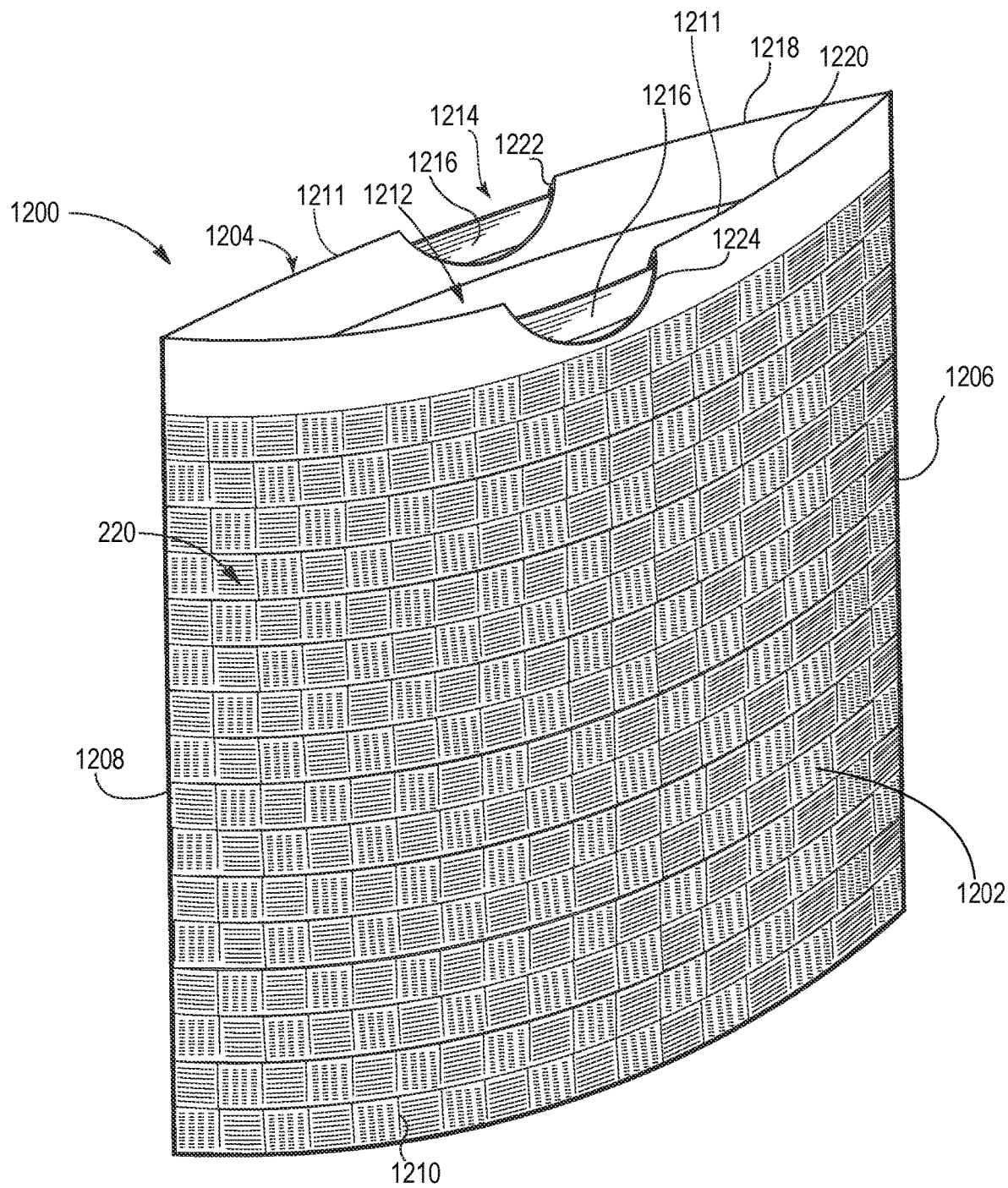
FIG. 12 shows a perspective view of a bag having a complex stretch pattern according to one or more implementations of the present disclosure.

As mentioned above, one or more implementations of the present disclosure include products made from or with such thermoplastic films with complex stretch patterns. For example, such products include, but are not limited to, grocery bags, trash bags, sacks, and packaging materials, feminine hygiene products, baby diapers, adult incontinence products, or other products. The remaining figures describe various bags including complex stretch patterns and methods of making the same. For example, FIG. 12 is a perspective view of a thermoplastic bag 1200 with a complex stretch pattern 220 according to an implementation of the present disclosure. The thermoplastic bag 1200 with a complex stretch pattern includes a first sidewall 1202 and a second sidewall 1204. Each of the first and second sidewalls 1202, 1204 includes a first side edge 1206, a second opposite side edge 1208, a bottom edge 1210 extending between the first and second side edges 1206, 1208, and top edge 1211 extending between the first and second side edges 1206, 1208 opposite the bottom edge. In some implementations, the first sidewall 1202 and the second sidewall 1204 are joined together along the first side edges 1206, the second opposite side edges 1208, and the bottom edges 1210. The first and second sidewalls 1202, 1204 may be joined along the first and second side edges 1206, 1208 and bottom edges 1210 by any suitable process such as, for example, a heat seal. In alternative implementations, the first and second sidewalls 1202, 1204 may not be joined along the side edges. Rather, the first and second sidewalls 1202, 1204 may be a single uniform piece. In other words, the first and second sidewalls 1202, 1204 may form a sleeve or a balloon structure.

In some implementations, the bottom edge 1210 or one or more of the side edges 1206, 1208 can comprise a fold. In other words, the first and second sidewalls 1202, 1204 may comprise a single unitary piece of material. The top edges 1211 of the first and second sidewalls 1202, 1204 may define an opening 1212 to an interior of the thermoplastic bag 1200 with a complex stretch pattern. In other words, the opening 1212 may be oriented opposite the bottom edge 1210 of the thermoplastic bag 1200 with a complex stretch pattern. Furthermore, when placed in a trash receptacle, the top edges 1211 of the first and second sidewalls 1202, 1204 may be folded over the rim of the receptacle.

In some implementations, the thermoplastic bag 1200 with a complex stretch pattern may optionally include a closure mechanism 1214 located adjacent to the top edges 1211 for sealing the top of the thermoplastic bag 1200 with a complex stretch pattern to form an at least substantially fully-enclosed container or vessel. As shown in FIG. 12, in some implementations, the closure mechanism 1214 comprises a draw tape 1216, a first hem 1218, and a second hem 1220. In particular, the first top edge 1211 of the first sidewall 1202 may be folded back into the interior volume and may be attached to an interior surface of the first sidewall 1202 to form the first hem 1218. Similarly, the second top edge 1211 of the second sidewall 1204 is folded back into the interior volume and may be attached to an interior surface of the second sidewall 1204 to form a second hem 1220. The draw tape 1216 extends through the first and second hems 1218, 1220 along the first and second top edges 1211. The first hem 1218 includes a first aperture 1222 (e.g., notch) extending through the first hem 1218 and exposing a portion of the draw tape 1216. Similarly, the second hem 1220 includes a second aperture 1224 extending through the second hem 1220 and exposing another portion of the draw tape 1216. During use, pulling the draw tape 1216 through the first and second apertures 1222, 1224 will cause the first and second top edge 1210 to constrict. As a result, pulling the draw tape 1216 through the first and second apertures 1222, 1224 will cause the opening 1212 of the thermoplastic bag with a complex stretch pattern to at least partially close or reduce in size. The draw tape closure mechanism 1214 may be used with any of the implementations of a reinforced thermoplastic bag described herein.

Although the thermoplastic bag 1200 with a complex stretch pattern is described herein as including a draw tape closure mechanism 1214, one of ordinary skill in the art will readily recognize that other closure mechanisms 1214 may be implemented into the thermoplastic bag 1200 with a complex stretch pattern. For example, in some implementations, the closure mechanism 1214 may include one or more of flaps, adhesive tapes, a tuck and fold closure, an interlocking closure, a slider closure, a zipper closure, or any other closure structures known to those skilled in the art for closing a bag.

As shown in FIG. 12, the thermoplastic bag 1200 may include a complex stretch pattern 220 formed in one or more of the first sidewall 1202 and the second sidewall 1204. For example, as is discussed below, the complex stretch pattern may be formed in the first sidewall 1202 and/or the second sidewall 1204 via one or more of SELF'ing rollers or micro-SELF'ing rollers. The plurality of raised rib-like elements and the plurality of web areas of the complex stretch pattern 220 are sized and positioned such that: the thermoplastic bag 1200 has a stretch profile with a complex shape, the thermoplastic bag 1200 undergoes both geometric and molecular deformation in initial elongation zone when strained, the thermoplastic bag 1200 undergoes multiple phases in which a major portion of the deformation of the thermoplastic bag is geometric deformation, and/or when subjected to an applied and subsequently released load, billows are formed in the thermoplastic bag 1200 with one or more of heights greater than 3000 micrometers or widths greater than 3000 micrometers.

Figure 13:
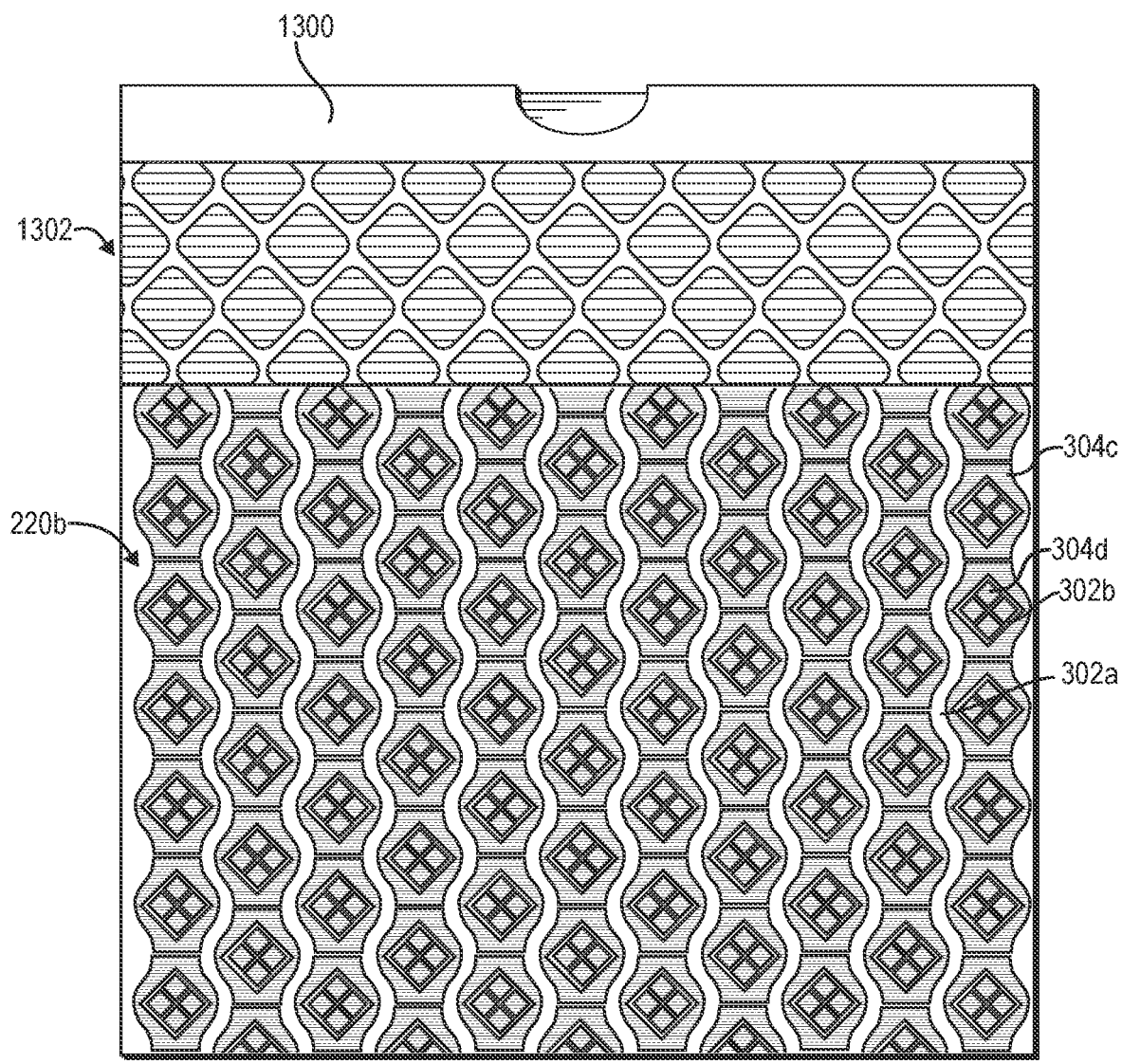
FIG. 13 is a front side view of a bag with a complex stretch pattern in the form of elongated bulbs with enclosed diamonds according to an implementation of the present disclosure.

FIG. 13 shows another thermoplastic bag 1300 with sidewalls including a complex stretch pattern 220b formed therein. The thermoplastic bag 1300 can include the same structure as the thermoplastic bag 1200 albeit with a different complex stretch pattern. In particular, the thermoplastic bag 1300 may include a first plurality of raised rib-like elements 304c in a macro pattern (e.g., a bulbous pattern) and a second plurality of raised rib-like elements 304d in a micro pattern (e.g., four diamonds). As shown, the second plurality of raised rib-like elements 304d in the micro pattern are nested within the macro patterns. Furthermore, the thermoplastic bag 1300 includes web areas 302a, 302b. The web areas 302a, 302b can surround the micro and the macro patterns of raised rib-like elements. Furthermore, as shown by FIG. 13, the web areas 302a are arranged in a sinusoidal pattern. The plurality of raised rib-like elements and the plurality of web areas of the complex stretch pattern 220b are sized and positioned such that: the thermoplastic bag 1300 has a stretch profile with a complex shape, the thermoplastic bag 1300 undergoes both geometric and molecular deformation in initial elongation zone when strained, the thermoplastic bag 1300 undergoes multiple phases in which a major portion of the deformation of the thermoplastic bag is geometric deformation, and/or when subjected to an applied and subsequently released load, billows are formed in the thermoplastic bag 1300 with one or more of heights greater than 3000 micrometers or widths greater than 3000 micrometers.

Additionally, FIG. 13 illustrates that the thermoplastic bags described herein can include complex stretch patterns 220b in certain areas of the bag 1300 and other patterns (complex stretch or non-complex stretch) in other areas of the bag 1300. In particular, FIG. 13 illustrates a top portion of the bag 1300 proximate the hem includes a fenced diamond pattern 1302. The fenced diamond pattern 1302 can comprise raised-rib-like elements arranged in diamond patterns where the intersections of the sides of the diamond are rounded rather than ending in corners.

Figure 14:
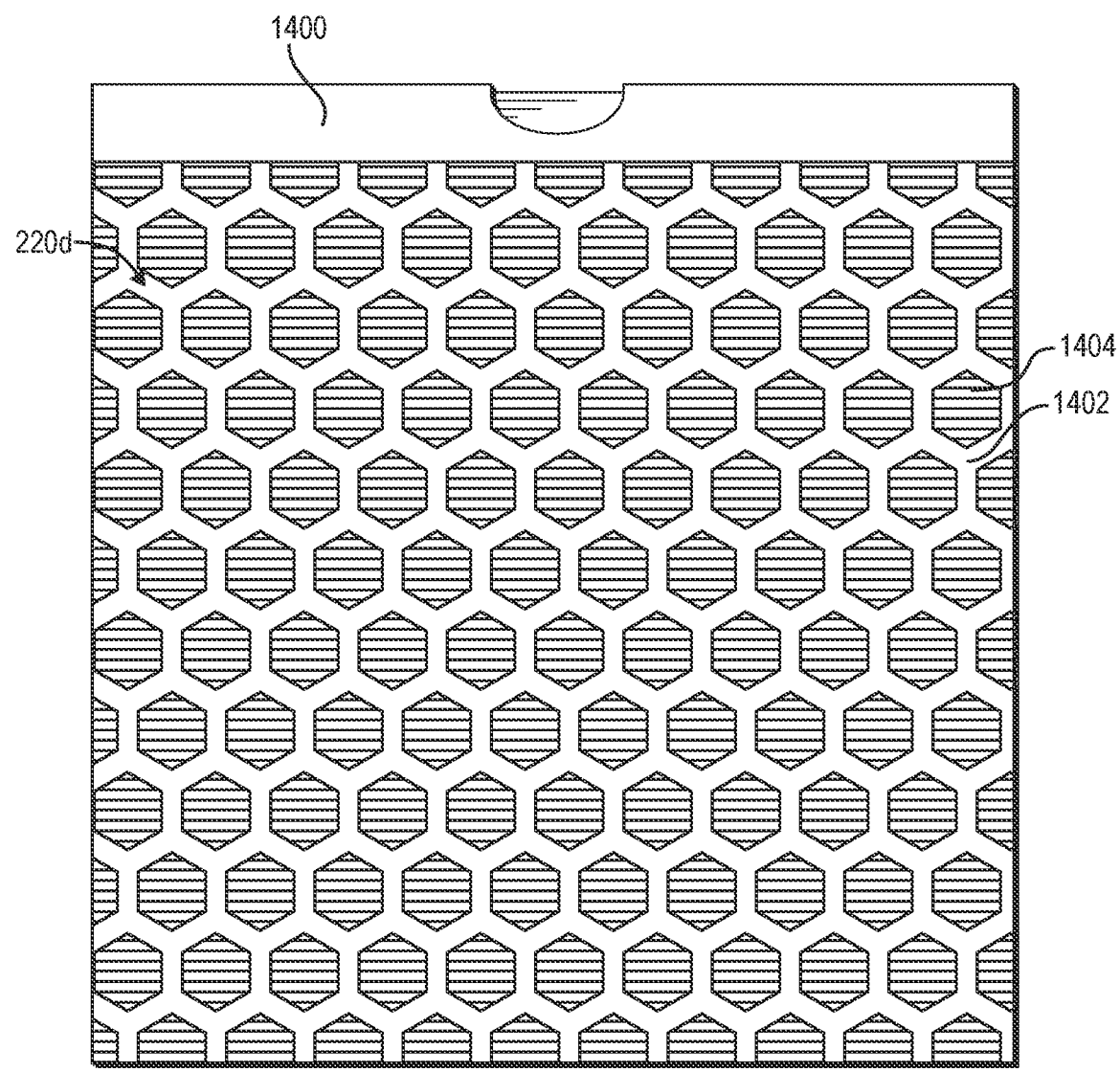
FIG. 14 is a front side view of a bag with a complex stretch pattern in the form of hexagons according to an implementation of the present disclosure.

FIG. 14 illustrates yet another thermoplastic bag 1400 with sidewalls including a complex stretch pattern 220d formed therein. The thermoplastic bag 1400 can include the same structure as the thermoplastic bag 1200 albeit with a different complex stretch pattern. In particular, the thermoplastic bag 1400 may include a plurality of raised rib-like elements 1404 in a hexagon pattern. As shown, the raised rib-like elements 1404 are surrounded by web areas 1402. The plurality of raised rib-like elements and the plurality of web areas of the complex stretch pattern 220d are sized and positioned such that: the thermoplastic bag 1400 has a stretch profile with a complex shape, the thermoplastic bag 1400 undergoes both geometric and molecular deformation in initial elongation zone when strained, the thermoplastic bag 1400 undergoes multiple phases in which a major portion of the deformation of the thermoplastic bag is geometric deformation, and/or when subjected to an applied and subsequently released load, billows are formed in the thermoplastic bag 1400 with one or more of heights greater than 3000 micrometers or widths greater than 3000 micrometers.

Figure 15:
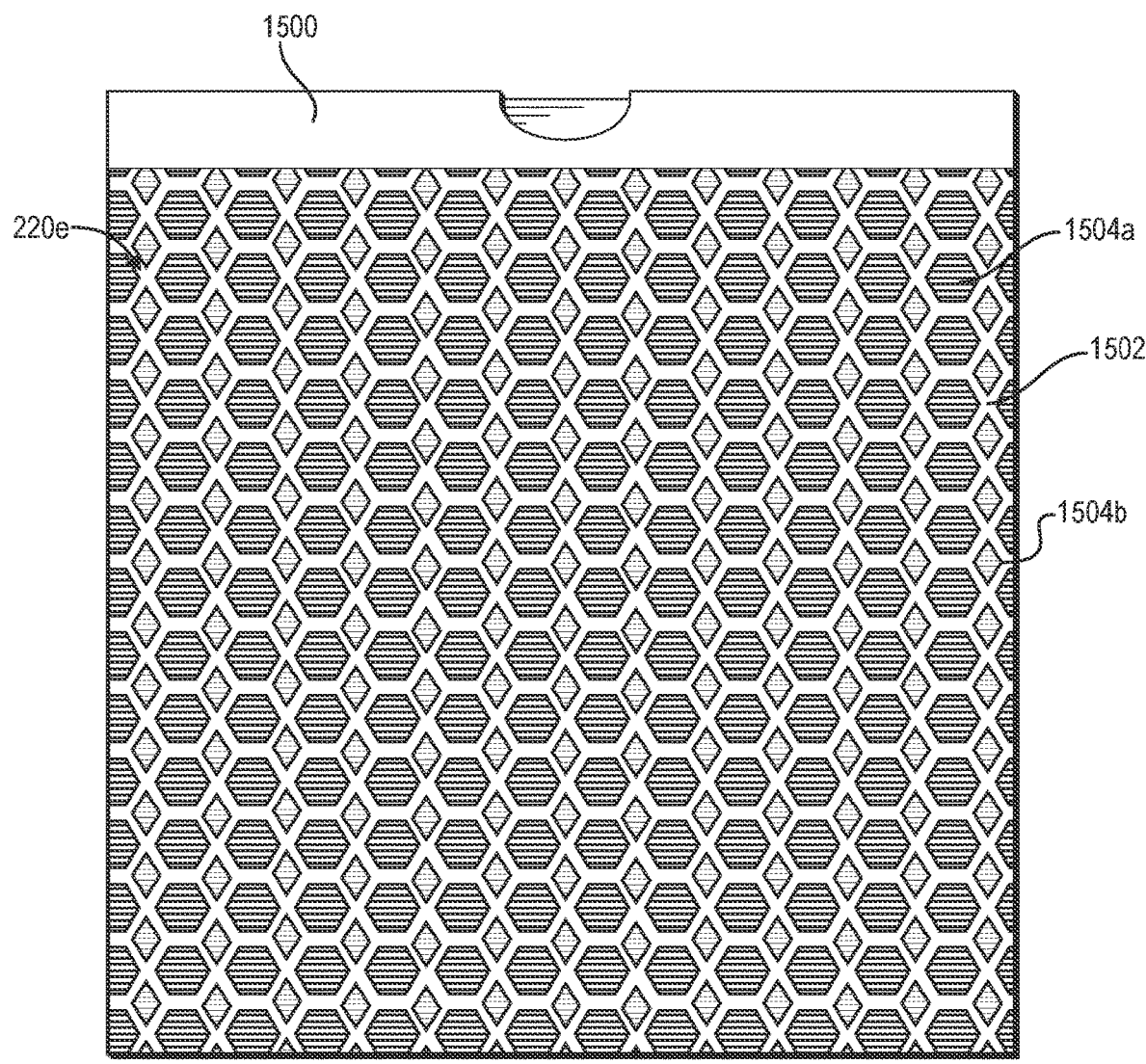
FIG. 15 is a front side view of a bag with a complex stretch pattern in the form of hexagons and elongated diamonds according to an implementation of the present disclosure.

FIG. 15 illustrates a thermoplastic bag 1500 with sidewalls including a complex stretch pattern 220e formed therein. In particular, the complex stretch pattern 220e can comprise raised rib-like elements 1504a in hexagon patterns, raised rib-like elements 1504b in diamond patterns, and web areas 1502 positioned between and surrounding the hexagon and diamond patterns. The plurality of raised rib-like elements and the plurality of web areas of the complex stretch pattern 220e are sized and positioned such that: the thermoplastic bag 1500 has a stretch profile with a complex shape, the thermoplastic bag 1500 undergoes both geometric and molecular deformation in initial elongation zone when strained, the thermoplastic bag 1500 undergoes multiple phases in which a major portion of the deformation of the thermoplastic bag is geometric deformation, and/or when subjected to an applied and subsequently released load, billows are formed in the thermoplastic bag 1500 with one or more of heights greater than 3000 micrometers or widths greater than 3000 micrometers.

Figure 16:
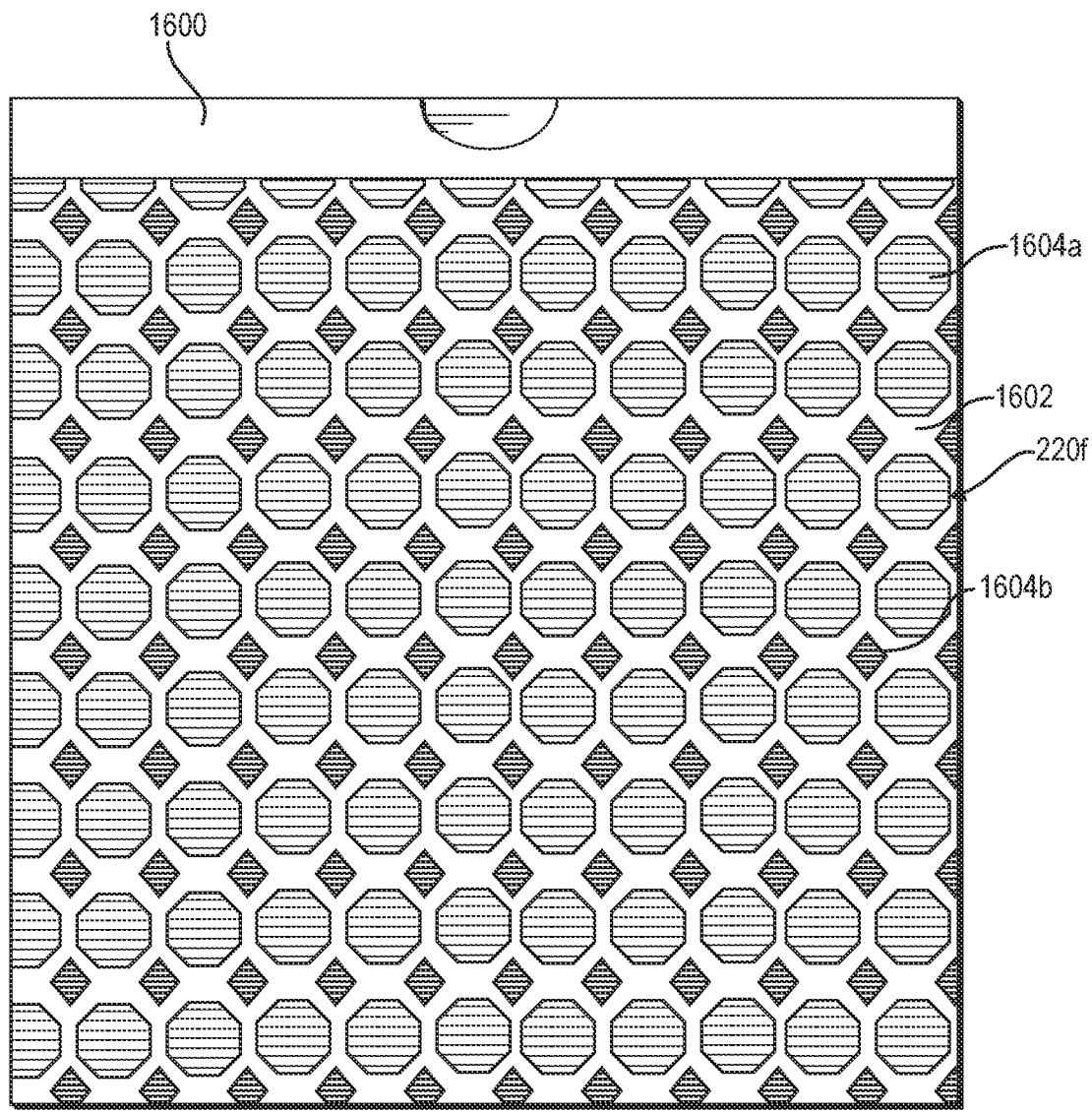
FIG. 16 is a front side view of another bag with a complex stretch pattern in the form of hexagons and diamonds according to an implementation of the present disclosure.

FIG. 16 illustrates a thermoplastic bag 1600 with sidewalls including a complex stretch pattern 220f formed therein. In particular, the complex stretch pattern 220f can comprise raised rib-like elements 1604a in octagon patterns, raised rib-like elements 1604b in diamond patterns, and web areas 1602 positioned between and surrounding the octagon and diamond patterns. The plurality of raised rib-like elements and the plurality of web areas of the complex stretch pattern 220f are sized and positioned such that: the thermoplastic bag 1600 has a stretch profile with a complex shape, the thermoplastic bag 1600 undergoes both geometric and molecular deformation in initial elongation zone when strained, the thermoplastic bag 1600 undergoes multiple phases in which a major portion of the deformation of the thermoplastic bag is geometric deformation, and/or when subjected to an applied and subsequently released load, billows are formed in the thermoplastic bag 1600 with one or more of heights greater than 3000 micrometers or widths greater than 3000 micrometers.

Figure 17:
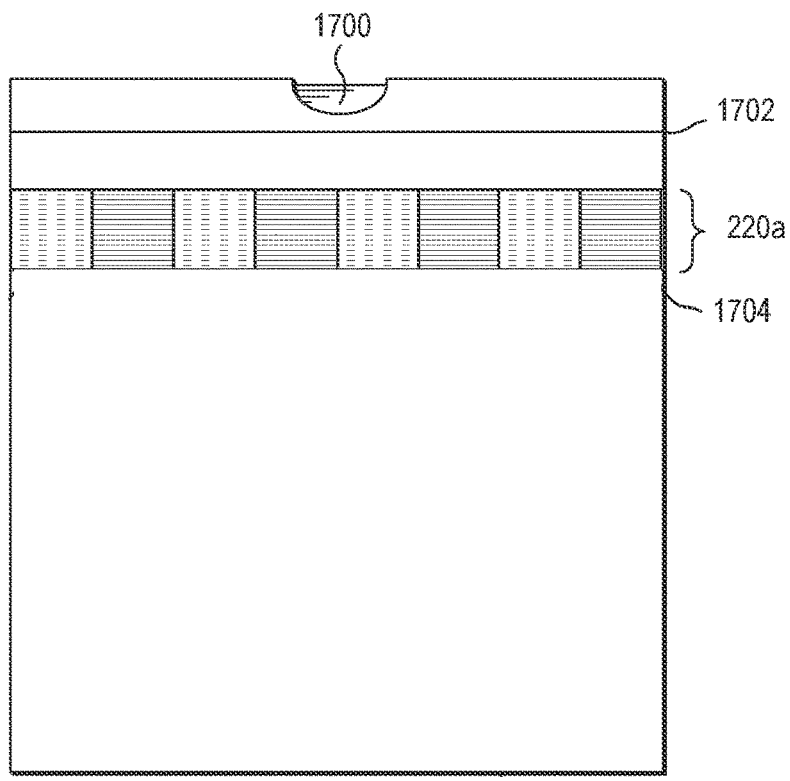
FIG. 17 is a front side view of a bag with a complex stretch pattern in a band across the width of the bag but only a portion of the height of the bag according to an implementation of the present disclosure.

While the bags shown and described above include complex stretch patterns formed in the entire sidewalls of the bags, one will appreciate in light of the disclosure herein that the present invention is not so limited. In alternative embodiments, the bags can comprise complex stretch patterns in zones or areas so as to provide tailor stretch properties to different areas of the bag. For example, FIG. 17 illustrates a thermoplastic bag 1700 including a complex stretch pattern 220a formed in a band proximate a hem 1702 of the bag 1700. Thus, as shown a bottom portion 1704 of the bag 1700 (i.e., each sidewall) is devoid of raised rib-like elements.

Figure 18:
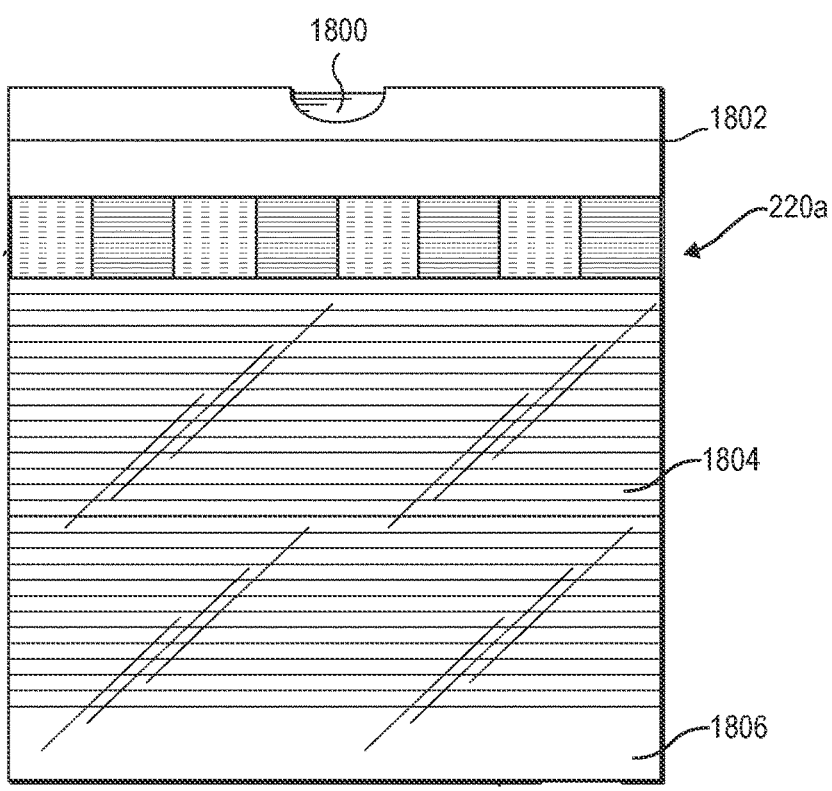
FIG. 18 is a front side view of another bag with a complex stretch pattern in a band across the width of the bag but only a portion of the height of the bag according to an implementation of the present disclosure.

FIG. 18 illustrates another thermoplastic bag 1800 including a complex stretch pattern 220a formed in a band proximate a hem 1802 of the bag 1800. Rather than a middle portion 1804 of the bag (i.e., each sidewall) being devoid of raised rib-like elements, the middle portion 1804 includes incrementally stretched ribs formed by ring rolling as described in U.S. Pat. No. 9,637,278, the entire contents of which are hereby incorporated by reference. The thermoplastic bag 1800 also includes an un-stretched bottom region 1806 that is devoid of raised rib-like elements and incremental stretching.

Figure 19:
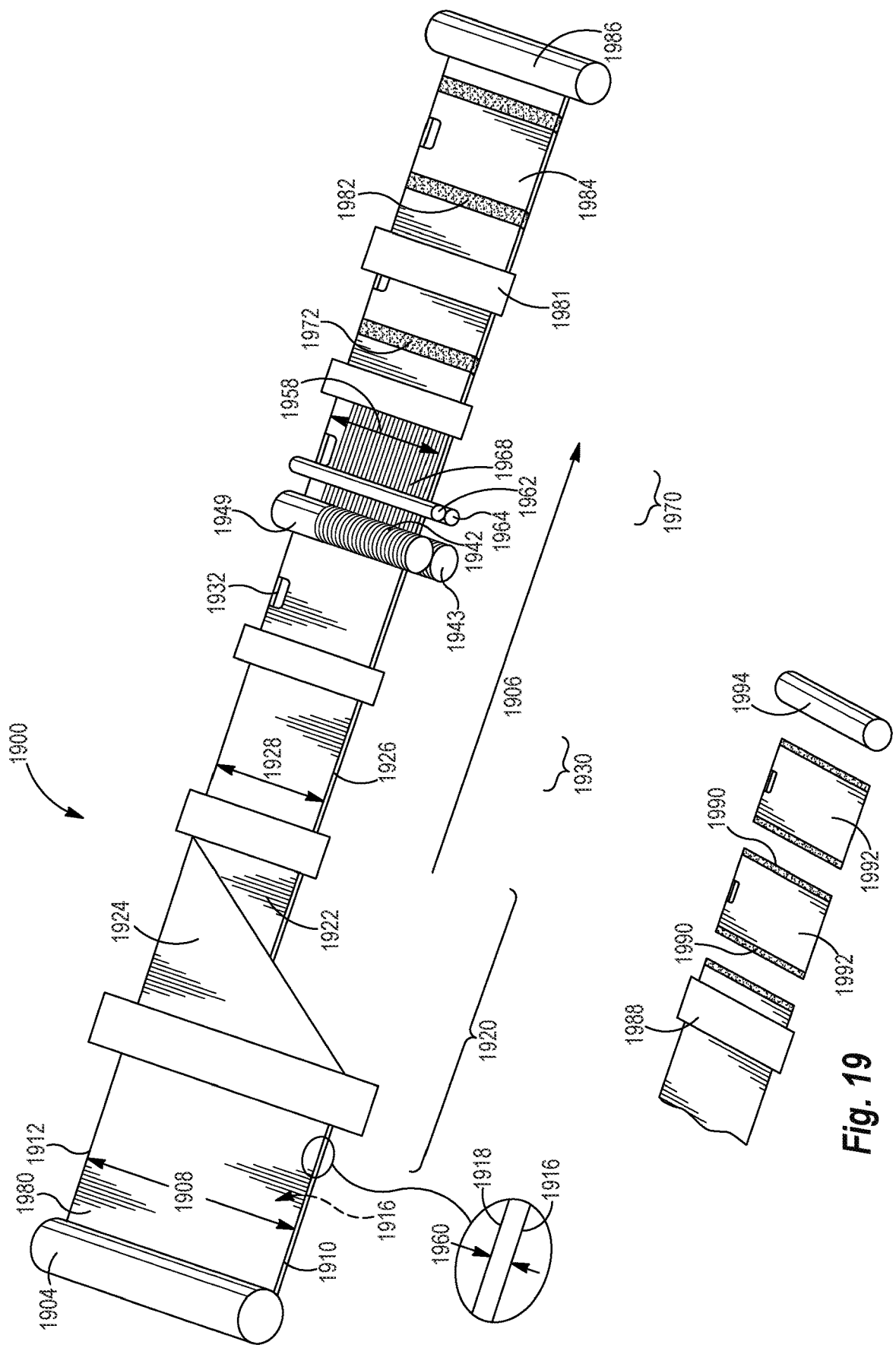
FIG. 19 illustrates a schematic diagram of a process for manufacturing bags with complex stretch patterns in accordance with one or more implementations of the present disclosure.

To produce a bag having a complex stretch pattern as described, continuous webs of thermoplastic material may be processed through a high-speed manufacturing environment such as that illustrated in FIG. 19. In the illustrated process 1900, production may begin by unwinding a first continuous web or film 1980 of thermoplastic sheet material from a roll 1904 and advancing the web along a machine direction 1906. The unwound web 1980 may have a width 1908 that may be perpendicular to the machine direction 1906, as measured between a first edge 1910 and an opposite second edge 1912. The unwound web 1980 may have an initial average thickness 1960 measured between a first surface 1916 and a second surface 1918. In other manufacturing environments, the web 1980 may be provided in other forms or even extruded directly from a thermoplastic forming process. To provide the first and second sidewalls of the finished bag, the web 1980 may be folded into a first half 1922 and an opposing second half 1924 about the machine direction 1906 by a folding operation 1920. When so folded, the first edge 1910 may be moved adjacent to the second edge 1912 of the web. Accordingly, the width of the web 1980 proceeding in the machine direction 1906 after the folding operation 1920 may be a width 1928 that may be half the initial width 1908. As may be appreciated, the portion mid-width of the unwound web 1980 may become the outer edge of the folded web. In any event, the hems may be formed along the adjacent first and second edges 1910, 1912 and a draw tape 1932 may be inserted during a hem and draw tape operation 1930.

To form a complex stretch pattern 1968, the processing equipment may include SELF'ing intermeshing rollers 1942, 1943 such as those described herein above. Referring to FIG. 19, the folded web 1980 may be advanced along the machine direction 1906 between the SELF'ing intermeshing rollers 1942, 1943, which may be set into rotation in opposite rotational directions to impart the resulting complex stretch pattern 1968. To facilitate patterning of the web 1980, the first roller 1942 and second roller 1943 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the complex stretch pattern 1968 intermeshing rollers 1942, 1943 may be arranged so that they are co-extensive with or wider than the width 1908 of the folded web 180. In one or more implementations, the complex stretch pattern 1968 intermeshing rollers 1942, 1943 may extend from proximate the folded edge 1926 to the adjacent edges 1910, 1912. To avert imparting the complex stretch pattern 1968 onto the portion of the web that includes the draw tape 1932, the corresponding ends 1949 of the rollers 1942, 1943 may be smooth and without the ridges and grooves. Thus, the adjacent edges 1910, 1912 and the corresponding portion of the web proximate those edges that pass between the smooth ends 1949 of the rollers 1942, 1943 may not be imparted with the complex stretch pattern 1968.

The processing equipment may include pinch rollers 1962, 1964 to accommodate the width 1958 of the web 1980. To produce the finished bag, the processing equipment may further process the folded web with the complex stretch pattern. For example, to form the parallel side edges of the finished bag, the web may proceed through a sealing operation 1970 in which heat seals 1972 may be formed between the folded edge 1926 and the adjacent edges 1910, 1912. The heat seals may fuse together the adjacent halves 1922, 1924 of the folded web. The heat seals 1972 may be spaced apart along the folded web and in conjunction with the folded outer edge 1926 may define individual bags. The heat seals may be made with a heating device, such as, a heated knife. A perforating operation 1981 may perforate 1982 the heat seals 1972 with a perforating device, such as, a perforating knife so that individual bags 1984 may be separated from the web. In one or more implementations, the webs may be folded one or more times before the folded webs may be directed through the perforating operation. The web 1980 embodying the bags 1984 may be wound into a roll 1986 for packaging and distribution. For example, the roll 1986 may be placed in a box or a bag for sale to a customer.

In one or more implementations of the process, a cutting operation 1988 may replace the perforating operation 1980. The web is directed through a cutting operation 1988 which cuts the webs at location 1990 into individual bags 1992 prior to winding onto a roll 1994 for packaging and distribution. For example, the roll 1994 may be placed in a box or bag for sale to a customer. The bags may be interleaved prior to winding into the roll 1994. In one or more implementations, the web may be folded one or more times before the folded web is cut into individual bags. In one or more implementations, the bags 1992 may be positioned in a box or bag, and not onto the roll 1994.

Figure 20:
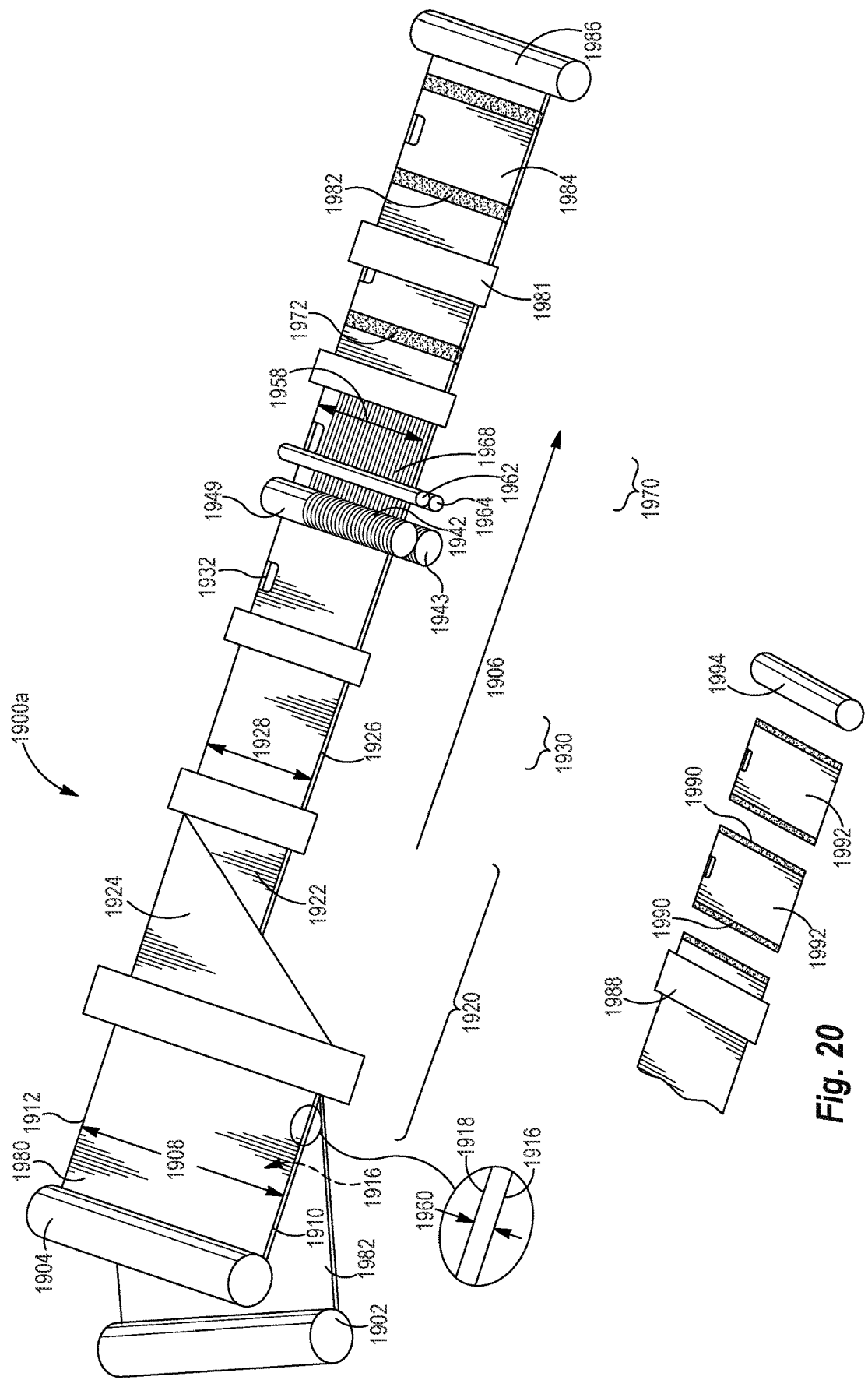
FIG. 20 illustrates a schematic diagram of a process for manufacturing thermoplastic bag with a complex stretch patterns with complex stretch patterns in accordance with one or more implementations of the present disclosure.

FIG. 20 illustrates a modified high-speed manufacturing 1900a that involves unwinding a second continuous web or film 1982 of thermoplastic sheet material from a roll 1902 and advancing the web along a machine direction 1906. The second film 1982 can comprise a thermoplastic material, a width, and/or a thickness that is similar or the same as the first film 1980. In alternative one or more implementations, one or more of the thermoplastic material, width, and/or thickness of the second film 1982 can differ from that of the first film 1980. The films 1980, 1982 can be folded together during the folding operation 1920 such that they pass through the SELF'ing intermeshing rollers 1942, 1943 together to form the complex stretch pattern and resulting multi-layered bags.

The following provides a procedure for generating stretch profiles as shown in FIGS. 10A-11B. The stretch profiles are obtained by using an Instron tensile test machine available from Instron Corporation of Canton, Massachusetts. Samples used for this test are 1 inch wide×2 inches long with the long axis of the sample cut parallel to the direction of maximum extensibility of the sample. The sample should be cut with a sharp exacto knife or some suitably sharp cutting device design to cut a precise 1 inch wide sample. The sample should be cut so that an area representative of the symmetry of the overall pattern of the deformed region is represented. There will be cases (due to variations in either the size of the deformed portion or the relative configurations of the complex stretch patterns) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested.

The grips of the Instron consist of air actuated grips designed to concentrate the entire gripping force along a single line perpendicular to the direction of testing stress having one flat surface and an opposing face from which protrudes a half round to minimize slippage of the sample. The distance between the lines of gripping force should be 2 inches as measured by a steel rule held beside the grips. This distance will be referred to from hereon as the "gauge length." The sample is mounted in the grips with its long axis perpendicular to the direction of applied percent elongation. The crosshead speed is set to 10 in/min. The crosshead elongates the sample until the sample breaks at which point the crosshead stops and returns to its original position (0% elongation).

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A thermoplastic bag comprising:
   a first sidewall and an opposing second sidewall of a thermoplastic material; and the first sidewall and the second sidewall each comprising a first side edge, an opposite second side edge, a bottom edge, and an opening along respective top edges;

wherein each of the first sidewall and the second sidewall comprises:
 a plurality of raised rib-like elements; and
 a plurality of web areas positioned about the plurality of raised rib-like elements;

wherein:
 the plurality of raised rib-like elements are arranged into a repeating macro pattern of raised rib-like elements and a repeating micro pattern of raised rib-like elements, and
 adjacent micro patterns of raised rib-like elements are separated by one or more macro patterns of raised rib-like elements.

2. The thermoplastic bag of claim 1, wherein the micro pattern of raised rib-like elements is nested within the macro pattern of raised rib-like elements.

3. The thermoplastic bag of claim 1, wherein one or more of the macro pattern of raised rib-like elements or the micro pattern of raised rib-like elements comprises a diamond pattern.

4. The thermoplastic bag of claim 3, wherein the other of the macro pattern of raised rib-like elements or the micro pattern of raised rib-like elements comprises a bulbous pattern.

5. The thermoplastic bag of claim 1, wherein each of the first sidewall and the second sidewall comprises a first thermoplastic layer incrementally bonded to a second thermoplastic layer.

6. The thermoplastic bag of claim 1, wherein:
 the macro pattern of raised rib-like elements has a first resistance to stretching; and
 the micro pattern of raised rib-like elements has a second resistance to stretching, wherein the second resistance to stretching is greater than the first resistance to stretching.

7. The thermoplastic bag of claim 1, wherein the repeating macro pattern of raised rib-like elements and the repeating micro pattern of raised rib-like elements form a checkerboard pattern.

8. The thermoplastic bag of claim 1, wherein the raised rib-like elements of the macro pattern are 1.5 to 20 times longer than raised rib-like elements of the micro pattern.

9. A thermoplastic bag comprising:
 first and second thermoplastic film sidewalls joined together along a first side edge, an opposite second side edge, and a closed bottom edge, wherein the first and second thermoplastic film sidewalls each comprise:
  a plurality of raised rib-like elements oriented parallel to a width of the thermoplastic film sidewall; and
  a plurality of non-linear sinusoidal web areas separating the plurality of raised rib-like elements into columns, wherein non-linear adjacent sinusoidal web areas are out of phase relative to each other so peaks of a given non-linear sinusoidal web area are aligned with troughs of a non-linear adjacent sinusoidal web area, the non-linear sinusoidal web areas running vertically from a top of the thermoplastic film sidewall to a bottom of the thermoplastic film sidewall.

10. The thermoplastic bag as recited in claim 9, wherein the plurality of raised rib-like elements comprises a first subset of raised rib-like elements arranged in diamond patterns.

11. The thermoplastic bag of claim 10, wherein the plurality of raised rib-like elements comprises a second subset of raised rib-like elements arranged in bulbous patterns.

12. The thermoplastic bag of claim 11, wherein the diamond patterns are nested within the bulbous patterns.

13. The thermoplastic bag of claim 12, wherein a plurality of diamond patterns are nested within each bulbous pattern.

14. The thermoplastic bag of claim 9, wherein each of the first sidewall and the second sidewall comprises a first thermoplastic layer incrementally bonded to a second thermoplastic layer.

15. A thermoplastic bag comprising:
 first and second thermoplastic film sidewalls joined together along a first side edge, an opposite second side edge, and a closed bottom edge; and
 a pattern of raised rib-like elements and web areas formed in each of the first and second thermoplastic film sidewalls, wherein the pattern of raised rib-like elements and web areas comprises repeating, non-continuous first and second patterns that alternate across a width and height of the thermoplastic bag, the second pattern having a different size of raised rib-like elements than the first pattern.

16. The thermoplastic bag as recited in claim 15, wherein:
 the first pattern comprises a plurality of columns of raised rib-like elements; and
 the second pattern comprises a single column of raised rib-like elements.

17. The thermoplastic bag of claim 16, wherein the first pattern further comprises intervening web areas between columns of raised rib-like elements, the intervening web areas having a same height of the thermoplastic bag as the columns of raised rib-like elements.

18. The thermoplastic bag of claim 15, wherein the repeating first and second patterns directly abut against each other such that no web areas separate adjacent instances of the first and second patterns.

19. The thermoplastic bag of claim 15, wherein the pattern comprises a checkerboard pattern.

20. The thermoplastic bag of claim 15, wherein the pattern is devoid of a sequence of one or more web areas that continuously connect from a top of the pattern to a bottom of the pattern.

* * * * *